(12) United States Patent
Park et al.

(10) Patent No.: US 10,983,551 B2
(45) Date of Patent: Apr. 20, 2021

(54) CLOCK MANAGEMENT UNIT, INTEGRATED CIRCUIT INCLUDING THE CLOCK MANAGEMENT UNIT, SYSTEM ON CHIP, AND METHOD OF OPERATING THE SYSTEM ON CHIP

(71) Applicant: Samsung Electronics Co., Ltd., Suwon-si (KR)

(72) Inventors: Tae-hong Park, Seoul (KR); Myung-chul Cho, Suwon-si (KR); Yun-ju Kwon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 750 days.

(21) Appl. No.: 15/185,505

(22) Filed: Jun. 17, 2016

(65) Prior Publication Data
US 2017/0038791 A1    Feb. 9, 2017

(30) Foreign Application Priority Data

Aug. 6, 2015 (KR) .......................... 10-2015-0111210

(51) Int. Cl.
*G06F 1/08* (2006.01)
*G06F 1/324* (2019.01)
*G06F 13/24* (2006.01)
*G06F 1/10* (2006.01)

(52) U.S. Cl.
CPC .............. *G06F 1/08* (2013.01); *G06F 1/324* (2013.01); *G06F 13/24* (2013.01); *Y02D 10/00* (2018.01)

(58) Field of Classification Search
CPC .................................. G06F 1/08; G06F 13/24
See application file for complete search history.

(56) References Cited

U.S. PATENT DOCUMENTS

| 6,212,646 | B1 * | 4/2001 | Miwa .................... G11C 16/32 711/103 |
| 6,671,795 | B1 | 12/2003 | Marr et al. |
| 6,856,566 | B2 | 2/2005 | Takahashi et al. |
| 7,120,810 | B2 | 10/2006 | Maher et al. |

(Continued)

FOREIGN PATENT DOCUMENTS

| CN | 101452337 A | 6/2009 |
| CN | 102955494 A | 3/2013 |

(Continued)

OTHER PUBLICATIONS

Taiwanese Office Action dated May 20, 2020 issued in corresponding Taiwanese Application No. 105124727.

(Continued)

*Primary Examiner* — Idriss N Alrobaye
*Assistant Examiner* — Dayton Lewis-Taylor
(74) *Attorney, Agent, or Firm* — Harness, Dickey & Pierce, P.L.C.

(57) ABSTRACT

In one embodiment, the integrated circuit includes a clock generator configured to selectively generate a first clock; a processor configured to perform operations; and a clock management circuit. The clock management circuit is configured to receive clock management information from the processor and selectively generate a second clock based on the clock management information and the first clock. The processor is configured to perform some operations based on the second clock.

19 Claims, 23 Drawing Sheets

(56) References Cited

U.S. PATENT DOCUMENTS

| | | |
|---|---|---|
| 7,159,133 B2 | 1/2007 | Orenstien et al. |
| 7,337,274 B2 | 2/2008 | Naruse et al. |
| 7,363,474 B2 | 4/2008 | Rodgers et al. |
| 7,430,143 B2 | 9/2008 | Choi |
| 7,500,126 B2 | 3/2009 | Terechko et al. |
| 7,647,509 B2 | 1/2010 | Lewites et al. |
| 8,156,275 B2 | 4/2012 | de Cesare et al. |
| 8,181,054 B2 | 5/2012 | Terechko et al. |
| 8,464,035 B2 | 6/2013 | Dixon et al. |
| 8,725,958 B2 | 5/2014 | Takata |
| 8,762,692 B2 | 6/2014 | Schuchman et al. |
| 8,816,743 B1 | 8/2014 | Lu et al. |
| 9,009,451 B2 | 4/2015 | Murray et al. |
| 9,672,305 B1* | 6/2017 | Vats ................. G06F 17/505 |
| 2006/0170479 A1* | 8/2006 | Hirata .................. G06F 1/10 327/295 |
| 2007/0277052 A1* | 11/2007 | Sargaison ............. G06F 1/12 713/400 |
| 2009/0125742 A1 | 5/2009 | Terechko et al. |
| 2014/0125381 A1 | 5/2014 | Schreiber et al. |
| 2015/0198966 A1* | 7/2015 | Lee .................... G06F 1/08 713/501 |
| 2016/0072480 A1* | 3/2016 | Coutts ............... H03K 3/012 326/46 |

FOREIGN PATENT DOCUMENTS

| | | |
|---|---|---|
| CN | 103116384 A | 5/2013 |
| CN | 104769841 A | 7/2015 |
| CN | 107315448 A | 11/2017 |
| KR | 10-2005-0085281 A | 8/2005 |
| KR | 10-2009-0014692 A | 2/2009 |
| TW | 544680 B | 8/2003 |
| TW | 200739581 A | 10/2007 |

OTHER PUBLICATIONS

Chinese Office Action dated Oct. 9, 2020 issued in corresponding Chinese Patent Application No. 201610642814.4.

* cited by examiner

CLOCK MANAGEMENT UNIT, INTEGRATED CIRCUIT INCLUDING THE CLOCK MANAGEMENT UNIT, SYSTEM ON CHIP, AND METHOD OF OPERATING THE SYSTEM ON CHIP

CROSS-REFERENCE TO RELATED APPLICATION

This application claims the benefit of Korean Patent Application No. 10-2015-0111210, filed on Aug. 6, 2015, in the Korean Intellectual Property Office, the disclosure of which is incorporated herein in its entirety by reference.

BACKGROUND

The inventive concepts relates to a processor and/or an operating method thereof, and more particularly, to a clock management unit, an integrated circuit including the clock management unit, a system on chip, and/or a method of operating the system on chip.

When software is implemented via a processor, cases when the processor waits while no operation is performed (NOP) during a relatively short time period may occur. A software delay function, such as NOP function, is used when a processor waits for completion of a hardware operation, such as interrupt processing, or when it is hard to call another function because an expected completion time of a hardware operation currently performed is short. However, even when the software delay function is executed, the processor unnecessarily consumes power due to a toggling of a clock.

SUMMARY

At least one embodiment relates to an integrated circuit.

In one embodiment, the integrated circuit includes a clock generator configured to selectively generate a first clock; a processor configured to perform operations; and a clock management circuit. The clock management circuit is configured to receive clock management information from the processor and selectively generate a second clock based on the clock management information and the first clock. The processor is configured to perform some operations based on the second clock.

In another embodiment, the integrated circuit includes a processor configured to perform operations based on a clock signal. The integrated circuit also includes a clock management circuit configured to receive clock management information from the processor, and configured to suspend transmission of the clock signal to the processor for a time period based on the clock management information.

At least one embodiment relates to a clock management circuit.

In one embodiment, the clock management circuit includes a clock gating circuit configured to receive a first clock, and to selectively generate a second clock based on the first clock and control signals. The clock management circuit also includes a control circuit configured to generate the control signals based on clock management information received from a processor.

At least one embodiment relates to a method of managing a clock.

In one embodiment, the method includes suspending, by a circuit, a supply of a clock to a processor for a period of time indicated in clock management information received from the processor.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
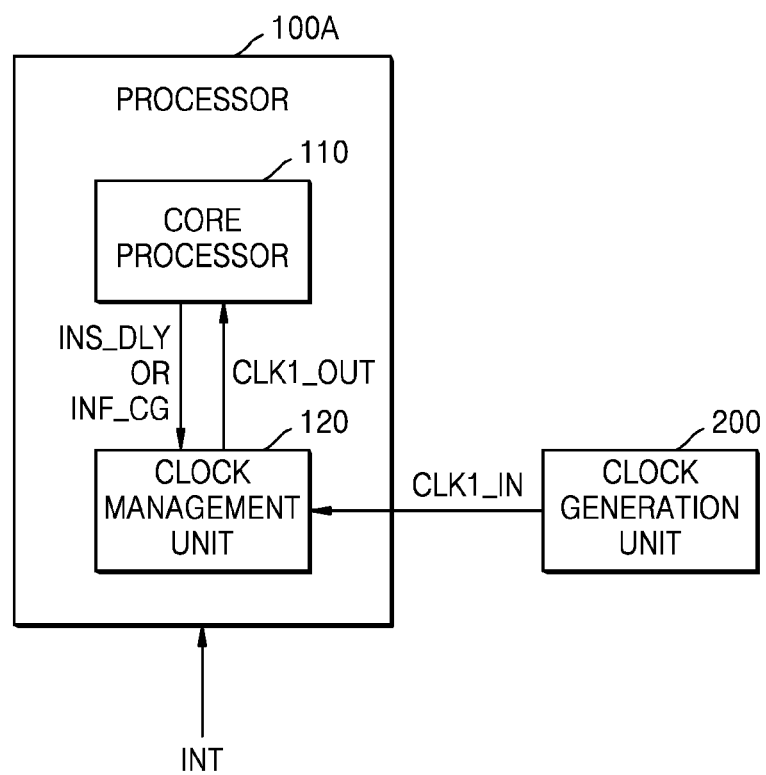
FIG. 1 illustrates a configuration of an integrated circuit including a clock management unit, according to an example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

The inventive concepts will now be described more fully with reference to the accompanying drawings, in which example embodiments of the inventive concepts are shown. The inventive concepts may, however, be embodied in many different forms and should not be construed as being limited to the example embodiments set forth herein; rather, these example embodiments are provided so that this disclosure will be thorough and complete, and will fully convey the concepts of the inventive concepts to those skilled in the art. Like reference numerals in the drawings denote like elements throughout the specification. In the drawings, lengths and sizes of layers and regions may be exaggerated or reduced for clarity. Expressions such as "at least one of" when preceding a list of elements, modify the entire list of elements and do not modify the individual elements of the list.

The terminology used herein is for the purpose of describing particular embodiments only and is not intended to be limiting of the inventive concepts. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, including technical and scientific terms, have the same meaning as commonly understood by one of ordinary skill in the art to which the inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a configuration of an integrated circuit 1000A according to an example embodiment.

Referring to FIG. 1, the integrated circuit 1000A may include a processor 100A and a clock generation unit 200. The processor 100A may include a core processor 110 and a clock management unit 120.

For example, the processor 100A may be applicable to a smart phone, a tablet personal computer (PC), a digital camera, a mobile device, a set-top box, a smart card system, a server system, and other various electronic devices.

The clock generation unit 200 may generate a first clock signal CLK1_IN that is input to the processor 100A. The clock generation unit 200 may generate the first clock signal CLK1_IN having a frequency for operation of the processor 100A. For example, the clock generation unit 200 may be any well-known oscillation circuit.

Alternatively, the clock generation unit 200 may be installed outside the integrated circuit 1000A. In this case, the first clock signal CLK1_IN, which is output from the clock generation unit 200, may be received by the processor 100A through a signal line that connects the integrated circuit 1000A and the clock generation unit 200.

The core processor 110 may also be referred to as a central processing unit (CPU). The core processor 110 may control operations of components that constitute the integrated circuit 1000A based on programmed software. For example, the core processor 110 may include a register block, an instruction decoder, an arithmetic logic unit (ALU), a control logic, and the like.

The core processor 110 may sequentially perform three-stage operations including an instruction fetch operation, an instruction decoding operation, and an instruction execution operation according to instruction pipelining based on the first clock signal CLK1_OUT transmitted by the clock management unit 120.

Alternatively, the core processor 110 may sequentially perform two-stage operations including an instruction fetch operation and an instruction execution operation when a two-stage instruction pipeline is employed. Alternatively, the core processor 110 may sequentially perform four-stage operations including an instruction fetch operation, an instruction decoding operation, an operand fetch operation, and an instruction execution operation when a four-stage instruction pipeline is employed. Various instruction pipeline schemes may be employed, in addition to the above-described instruction pipeline schemes.

When the processor 100A implements software, there may be a case where there occurs a period in which the core processor 110 waits while executing no operation. For example, the case may include a case of waiting for completion of a hardware operation, such as interrupt processing, or a case where it is hard to call another function because an expected completion time of a hardware operation being currently driven is short.

In this case, the core processor 110 may perform a time delay operation according to no operation (NOP) processing using a delay function. Even when the delay operation according to NOP processing is performed, the core processor 110 may use the clock signal. Due to this, power consumption may be caused.

According to example embodiments, when there occurs a period in which the core processor 110 waits while executing no operation, a delay operation and a clock gating operation may be performed by using hardware including a timer circuit according to an initially set delay instruction INS_DLY, reducing power consumption while maintaining instruction pipeline. For example, a delay instruction INS_DLY may be defined as a specific instruction according to an example embodiment.

When an initially set delay instruction INS_DLY is called, the core processor 110 may generate clock control factor information INF_CG corresponding to the delay instruction and transfer the clock control factor information INF_CG to the clock management unit 120.

For example, the core processor 110 may generate the clock control factor information INF_CG based on a result of decoding the delay instruction INS_DLY. For example, the clock control factor information INF_CG may include information on a length of a time delay period. The clock control factor information INF_CG may further include at least one of clock division ratio setting information, force gating information, and status information.

The clock division ratio setting information is information for determining which division ratio is to be used to divide the first clock signal CLK1_IN to lower a frequency of the first clock signal CLK1_IN in order to generate a clock signal used for time measurement in the timer circuit of the clock management unit 120.

The force gating information may be function setting information for ignoring an interrupt although the interrupt is generated during the time delay period triggered by execution of the delay instruction INS_DLY. The status information may be function setting information for informing the core processor 110 of a current status of the clock management unit 120. For example, the status information may be setting information for supporting a function of informing, by the clock management unit 120, the core processor 110 of how much a delay time remains when the core processor 110 again operates due to the interrupt during the time delay period upon execution of the delay instruction INS_DLY.

The clock management unit 120 may perform the clock gating operation of cutting off transmission of the first clock signal CLK1_IN to the core processor 110 during a target time period that is determined based on the clock control factor information INF_CG received from the core processor 110 when the delay instruction INS_DLY is executed by the core processor 110. Therefore, the first clock signal CLK1_OUT on which the clock gating operation is performed may be transmitted to a clock signal line of the core processor 110 during the target time period. For example, the target time period is a time delay period and may be determined as being a period from a time when the delay instruction INS_DLY is executed to a time corresponding to a length of the time delay period according to the clock control factor information INF_CG.

Alternatively, when the delay instruction INS_DLY is called, the core processor 110 may transfer the delay instruction INS_DLY to the clock management unit 120 as is. In this case, the clock management unit 120 may decode the received delay instruction INS_DLY and perform the clock gating operation based on a decoding result.

As described above, it is possible to perform the delay operation and the clock gating operation through the clock management unit 120 that is implemented by hardware, such as the timer circuit.

For example, when the force gating information is set to process an interrupt preferentially during the time delay period, the clock management unit 120 may operate as follows.

The clock management unit 120 may perform an operation of resuming transmission of the first clock signal CLK1_IN to the core processor 110 when an interrupt signal INT is received during the target time period that is a delay period determined based on the delay instruction INS_DLY. The clock management unit 120 may resume the clock gating operation of cutting off transmission of the first clock signal CLK1_IN to the core processor 110 in a case where the target time period has not elapsed even after the core processor 110 completes an interrupt task according to the interrupt signal INT.

When an interrupt is generated during a period between a time when execution of the delay instruction INS_DLY is started and a time when execution of the clock gating operation of cutting off transmission of the first clock signal CLK1_IN to the core processor 110 is started, the clock management unit 120 may perform an operation of allowing transmission of the first clock signal CLK1_IN to the core processor 110 until the interrupt task that is being executed is completed.

While not shown, the clock management unit 120 may receive control signals from the core processor 110 indicating completion of the interrupt task.

When the force gating information is set to ignore an interrupt generated during the time delay period, the clock management unit 120 may not allow transmission of the first clock signal CLK1_IN to the core processor 110 even when the interrupt signal INT is received during the target time period.

The core processor 110 may perform execution of a subsequent instruction to be executed after the delay instruction INS_DLY after the clock gating operation according to execution of the delay instruction INS_DLY is completed. According to instruction pipeline processing, the core processor 110 may simultaneously perform an operation of decoding the delay instruction INS_DLY and an operation of fetching the subsequent instruction to be executed after the delay instruction INS_DLY. The core processor 110 may simultaneously perform an operation of executing the delay instruction INS_DLY and an operation of decoding the subsequent instruction. The core processor 110 may complete the clock gating operation according to execution of the delay instruction INS_DLY and perform an operation of executing the decoded subsequent instruction. Therefore, it is possible to implement the exact time delay operation and the clock gating operation through hardware circuits while maintaining the instruction pipeline.

Figure 2:
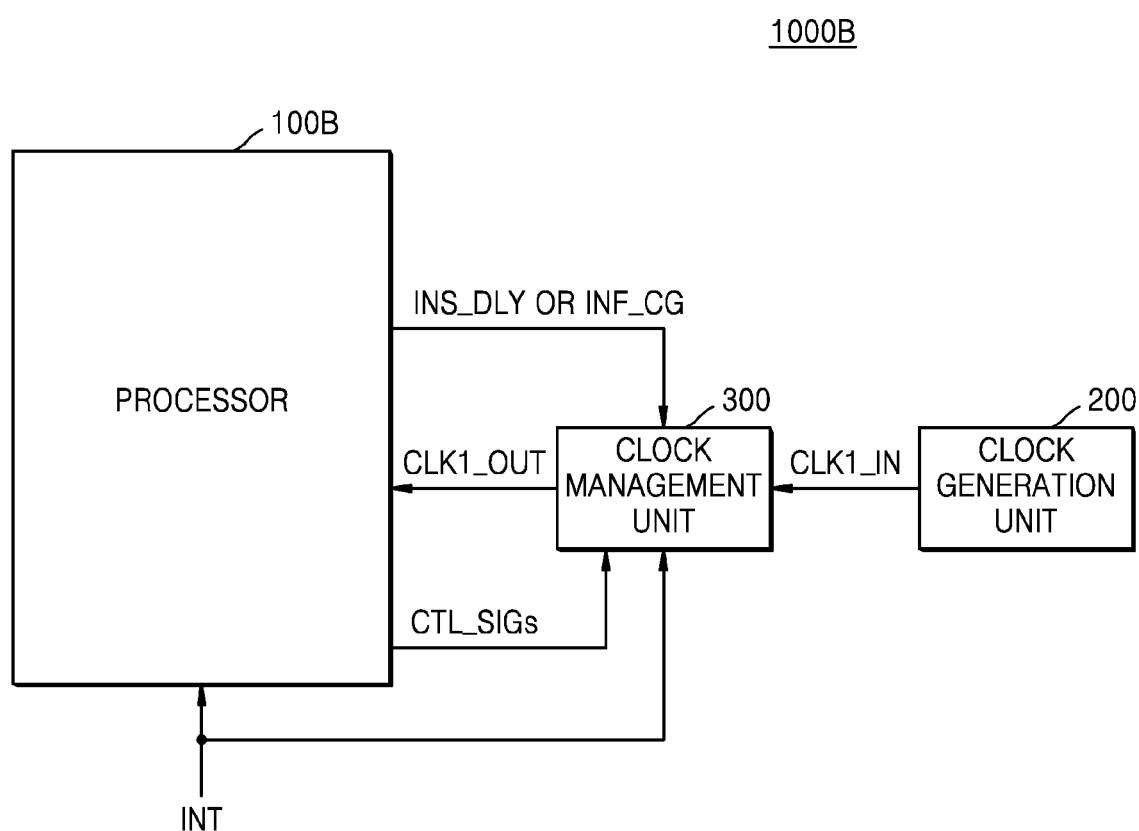
FIG. 2 illustrates a configuration of an integrated circuit including a clock management unit, according to another example embodiment.

FIG. 2 illustrates a configuration of an integrated circuit 1000B including a clock management unit 300, according to another example embodiment.

Referring to FIG. 2, the integrated circuit 1000B may include a processor 100B, a clock generation unit 200, and a clock management unit 300.

Since the clock generation unit 200 has been described with reference to FIG. 1, redundant descriptions thereof will be omitted. Similar to the integrated circuit 1000A, the clock generation unit 200 may be installed outside the integrated circuit 1000B. In this case, a first clock signal CLK1_IN, which is output from the clock generation unit 200, may be received by the clock management unit 300 of the integrated circuit 1000B through a signal line that connects the integrated circuit 1000B and the clock generation unit 200.

The processor 100B may perform instruction processing based on the first clock signal CLK1_OUT according to the instruction pipeline. The processor 100B may include a core processor. Examples of the processor 100B may include a single-core processor or a multi-core processor. For example, the processor 100B may be applicable to a smart phone, a tablet personal computer (PC), a digital camera, a mobile device, a set-top box, a smart card system, a server system, and other various electronic devices.

When an initially set delay instruction INS_DLY is called, the processor 100B may generate clock control factor information INF_CG corresponding to the delay instruction INS_DLY and transfer the generated clock control factor information INF_CG to the clock management unit 300. For example, the processor 100B may generate the clock control factor information INF_CG based on a result of decoding the delay instruction INS_DLY and transfer the generated clock control factor information INF_CG to the clock management unit 300. Since the clock control factor information INF_CG has been described with reference to FIG. 1, redundant descriptions thereof will be omitted.

Alternatively, when the delay instruction INS_DLY is called, the processor 100B may transfer the delay instruction INS_DLY to the clock management unit 300 as is.

The clock management unit 300 may perform a clock gating operation of cutting off transmission of the first clock signal CLK1_IN during a target time period that is determined based on the clock control factor information INF_CG received from the processor 100B when the delay instruction INS_DLY is executed by the processor 100B. Therefore, the first clock signal CLK1_OUT on which the clock gating operation is performed may be transmitted to a clock input terminal of the processor 100B during the target time period.

When the delay instruction INS_DLY is transferred to the clock management unit 300 from the processor 100B, the clock management unit 300 may decode the received delay instruction INS_DLY and perform the clock gating operation based on a decoding result. As a result, a delay operation and the clock gating operation are performed by the clock management unit 300 that is implemented by hardware.

For example, when force gating information according to the delay instruction INS_DLY is set to process an interrupt preferentially during the time delay period, the clock management unit 300 may operate as follows.

An interrupt signal INT may be applied both to the processor 100B and the clock management unit 300.

The clock management unit 300 may perform an operation of resuming transmission of the first clock signal CLK1_IN to the processor 100B when the interrupt signal INT is received during the target time period, which is a delay period determined based on the delay instruction INS_DLY. That is, when the interrupt signal INT is received, the first clock signal CLK1_IN may be switched on and may be output to the clock management unit 300. In addition, the first clock signal CLK1_OUT output from the clock management unit 300 may be transmitted to the processor 100B.

Therefore, the processor 100B may perform an interrupt task according to the interrupt signal. When the target time period has not elapsed even when the processor 100B completes the interrupt task, the clock management unit 300 may resume the clock gating operation of cutting off the first clock signal CLK1_IN. As shown, the processor 100B may provide the clock management unit 300 control signals CTL_SIGs, at least one of which indicates the completion of the interrupt task.

When an interrupt is generated during a period between a time when execution of the delay instruction INS_DLY is started and a time when execution of the clock gating operation of cutting off the first clock signal CLK1_IN is started, the clock management unit 300 may perform an operation of switching on the first clock signal CLK1_IN so as to allow transmission of the first clock signal CLK1_IN until the interrupt task that is being performed is completed. Therefore, the clock management unit 300 may transmit the first clock signal CLK1_OUT, from which a clock pulse is generated, to the processor 100B until the interrupt task is completed.

When the force gating information is set to ignore an interrupt generated during the time delay period, the clock management unit 300 may not suspend the clock gating operation even when the interrupt signal INT is received during the target time period.

The processor 100B may perform execution of a subsequent instruction to be executed after the delay instruction INS_DLY after the clock gating operation according to execution of the delay instruction INS_DLY is completed. According to instruction pipeline processing, the processor 100B may simultaneously perform an operation of decoding the delay instruction INS_DLY and an operation of fetching the subsequent instruction to be executed after the delay instruction INS_DLY. The processor 100B may simultaneously perform an operation of executing the delay instruction INS_DLY and an operation of decoding the subsequent instruction. The processor 100B may complete the clock gating operation according to execution of the delay instruction INS_DLY and perform an operation of executing the decoded subsequent instruction.

Figure 3:
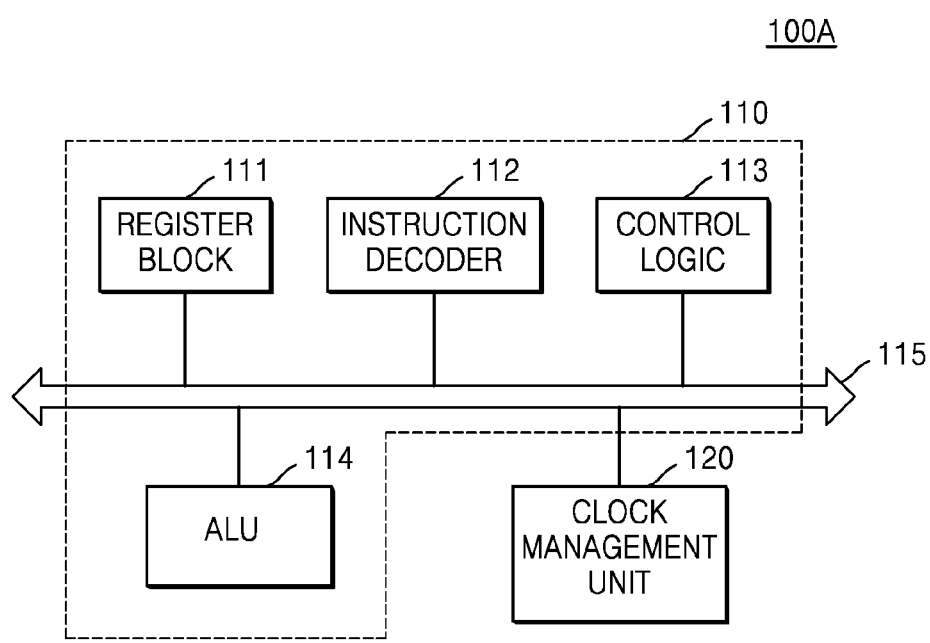
FIG. 3 illustrates a configuration of a processor including a clock management unit, according to an example embodiment.

FIG. 3 illustrates a configuration of a processor 100A including a clock management unit 120, according to an example embodiment.

Referring to FIG. 3, the processor 100A may include a register block 111, an instruction decoder 112, a control logic 113, an arithmetic logic unit (ALU) 114 and a bus 115 forming at least part of the core processor 110. The processor 100A also includes the clock management unit 120 connected to the bus 115.

A configuration including the register block 111, the instruction decoder 112, the control logic 113, the ALU 114, and the bus 115 among the components of the processor 110A may be referred to as a core processor.

The register block 111, the instruction decoder 112, the control logic 113, the ALU 114, and the clock management unit 120 that constitute the processor 100A may transfer and receive signals thereto or therefrom through the bus 115. The control logic 113 may perform an instruction processing operation for controlling operations of the components of the processor 100A.

The register block 111 may include registers that store data and registers that store instructions. Instructions called by the control logic 113 may be stored in the registers that store instructions. For example, the instructions may be read from a cache or memory connected to the processor 100A.

The instruction decoder 112 may perform an operation of decoding the instruction stored in the registers. The control logic 113 may execute a decoded instruction. The ALU 114 may perform operation functions, such as an arithmetic operation and a logic operation.

When the instruction decoded by the instruction decoder 112 is a delay instruction INS_DLY, the control logic 113 may generate clock control factor information INF_CG based on a result of decoding the delay instruction INS_DLY and transfer the generated clock control factor information INF_CG to the clock management unit 120 through the bus 115. Since the clock control factor information INF_CG has been described with reference to FIG. 1, redundant descriptions thereof will be omitted.

Alternatively, when the delay instruction INS_DLY is called, the control logic 113 may transfer the delay instruction INS_DLY to the clock management unit 120 as is.

The clock management unit 120 may perform a clock gating operation based on the clock control factor information INF_CG received from the control logic 113 when the delay instruction INS_DLY is executed. A process of performing the clock gating operation in the clock management unit 120 will be described below in detail.

Figure 4:
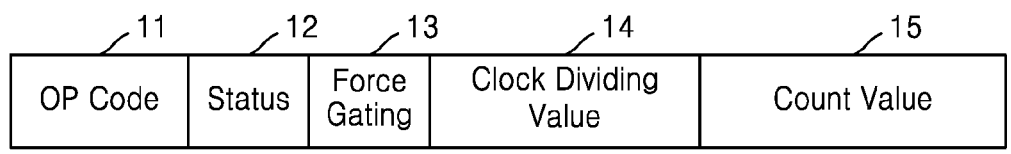
FIG. 4 illustrates a configuration of a delay instruction defined according to an example embodiment.

FIG. 4 illustrates a configuration of a delay instruction defined according to an example embodiment.

Referring to FIG. 4, the delay instruction INS_DLY that is defined to perform the clock gating operation during the time delay period may include, for example, an OP code field 11, a status field 12, a force gating field 13, a clock dividing value field 14, and a count value field 15.

In the OP code field 11, a code representing the time delay instruction is written. In the status field 12, information for setting a function of informing the core processor 110 of status information of the clock management unit 120 is written. For example, in the status field 12, information is written that indicates whether to support a function of informing, by the clock management unit 120, the core processor 110 of how much a delay time remains when the core processor 110 again operates due to the interrupt during the time delay period upon execution of the delay instruction INS_DLY. In the force gating field 13, information is written that indicates whether to support a function of ignoring an interrupt even when the interrupt is generated during the time delay period upon execution of the delay instruction INS_DLY. In the clock dividing value field 140, information is written that sets a clock division ratio of a clock divider included in the clock management unit 120. In the count value field 15, information on a length of the time delay period is written.

Figure 5:
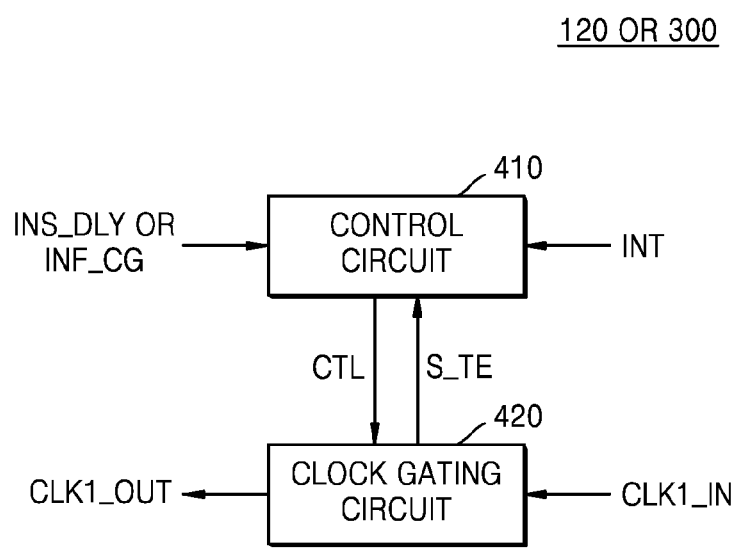
FIG. 5 illustrates a configuration of a clock management unit according to an example embodiment.

FIG. 5 illustrates a configuration of a clock management unit 120 or 300 according to an example embodiment.

Referring to FIG. 5, the clock management unit 120 or 300 may include a control circuit 410 and a clock gating circuit 420.

The control circuit 410 may receive a delay instruction INS_DLY or clock control factor information INF_CG from the core processor 110 or the processor 100B as well as the control signals CTL_SIGs. The clock control factor information INF_CG may be generated based on a result of decoding the delay instruction INS_DLY, and may include information on a length of a time delay period. The clock control factor information INF_CG may further include at least one of clock division ratio setting information, force gating information, and status information.

When the clock control factor information INF_CG is received, the control circuit 410 may generate a control signal CTL for performing a clock gating operation based on the clock control factor information INF_CG, and apply the control signal CTL to the clock gating circuit 420. The control signal CTL generated by the control circuit 410 may include one or more control signals to control components constituting the clock gating circuit 420. Examples of the control signal CTL may include a timer control signal CTL_TIMER for measuring a target time period that is a delay period determined based on the delay instruction INS_DLY, a division control signal CTL_DIV for controlling a division ratio of a clock divider that generates a clock signal used for time measurement, and a switching control signal CTL_SW for clock gating. The control circuit 410 may be a logic circuit, and a matter of design choice.

In a case where the delay instruction INS_DLY is received, the control circuit 410 may generate a first type of control signal during the target time period indicated by the delay instruction INS_DLY, a second type of control signal during periods other than the target time period, a third type of control signal when the interrupt signal INT is received during the target time period, and a fourth type of control signal when an interrupt task is terminated during the target time period. The first type of control signal may have a logic value for performing the clock gating operation such that a clock pulse is not output from the clock gating circuit 420. The second type of control signal may have a logic value for allowing the clock gating circuit 420 to output the clock pulse. The third type of control signal may have a logic value for allowing the clock gating circuit 420 to output a clock pulse. The fourth type of control signal may have a logic value for resuming the clock gating operation.

The above-described various types of control signals will be described below in detail with reference to FIGS. 13 to 17.

The clock gating circuit 420 may receive a first clock signal CLK1_IN. The clock gating circuit 420 may measure time by using a timer circuit according to the control signal CTL applied by the control circuit 410. The clock gating circuit 420 may transfer a timer expiration signal S_TE to the control circuit 410 when the target time period arrives as a result of measuring time. The control circuit 410 may generate a control signal CTL for terminating the clock gating operation when the timer expiration signal S_TE is received. In other words, the control circuit 410 may generate a control signal CTL for allowing the clock gating circuit 420 to output a clock pulse when the timer expiration signal S_TE is received.

The clock gating circuit 420 may control a switching circuit according to the control signal CTL applied by the control circuit 410 to perform the clock gating operation. An operation of the clock gating circuit 420 will be described in detail with reference to FIGS. 6 to 8.

Figure 6:
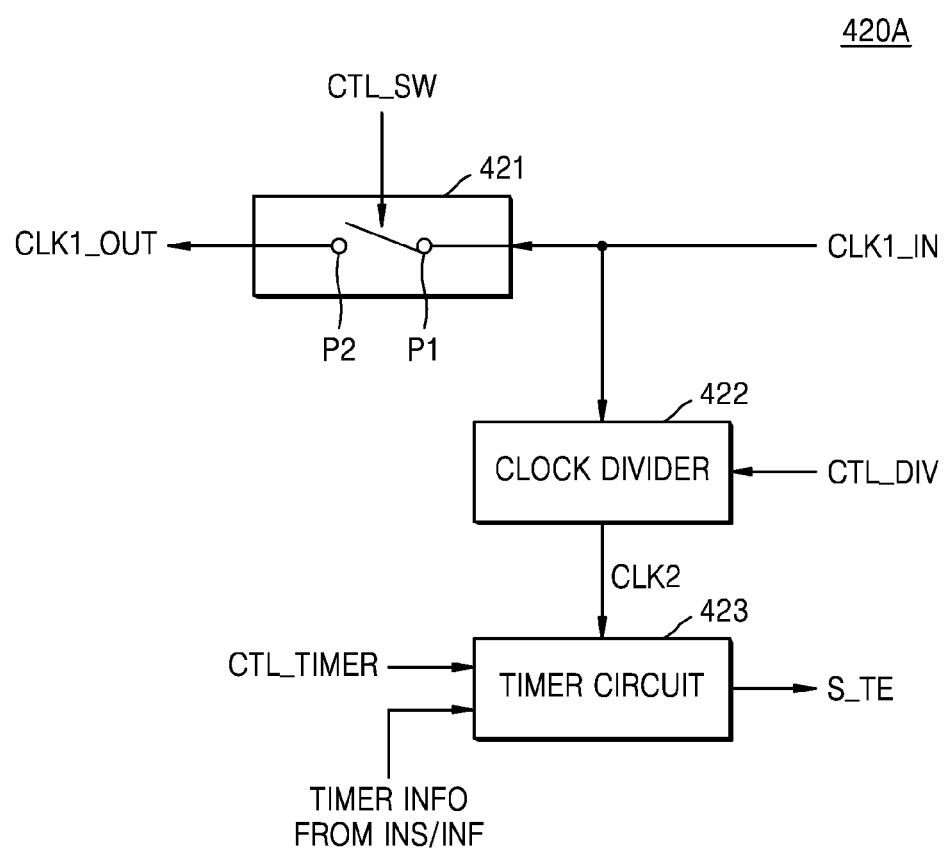
FIG. 6 illustrates a configuration of a clock gating circuit illustrated in FIG. 5, according to an example embodiment.

FIG. 6 illustrates an example 420A of a configuration of the clock gating circuit illustrated in FIG. 5.

Referring to FIG. 6, the clock gating circuit 420A may include a switching circuit 421, a clock divider 422, and a timer circuit 423.

The first clock signal CLK1_IN may be input to the switching circuit 421 and the clock divider 422. The switching circuit 421 may perform a switching operation of outputting or cutting off the first clock signal CLK1_IN according to a switching control signal CTL_SW applied by the control circuit 410.

For example, the switching circuit 421 may operate to be turned on in a period in which the switching control signal CTL_SW has a first logic state and operate to turned off in a period in which the switching control signal CTL_SW has a second logic state. Therefore, the switching circuit 421 may allow the first clock signal CLK1_IN input to a first terminal P1 to be output to a second terminal P2 in the period in which the switching control signal CTL_SW has the first logic state. In addition, the switching circuit 421 may cut off output of the first clock signal CLK1_IN input to the first terminal P1 to the second terminal P2 in the period in which the switching control signal CTL_SW has the second logic state That is, with respect to the first clock signal CLK1_OUT output from the second terminal P2 of the switching circuit 421, a clock pulse may be generated in the period in which the switching control signal CTL_SW has the first logic state, and a clock pulse may not be generated in the period in which the switching control signal CTL_SW has the second logic state. For example, the first clock signal CLK1_OUT may have a DC state (for example, 0V) in the period in which the switching control signal CTL_SW has the second logic state. The first clock signal CLK1_OUT may be output to a clock input terminal of the core processor 110 or a clock input terminal of the processor 100B.

The clock division ratio of the clock divider 422 may be determined according to the division control signal CTL_DIV applied from the control circuit 410. The clock divider 422 may divide the first clock signal CLK1_IN based on the determined clock division ratio and generate a second clock signal CLK2. Accordingly, the second clock signal CLK2 may have a lower frequency than that of the first clock signal CLK1_IN.

The timer circuit 423 may generate the timer expiration signal S_TE when the target time period indicated by the delay instruction INS_DLY arrives and transfer the generated timer expiration signal S_TE to the control circuit 410, based on the second clock signal CLK2. Specifically, the timer circuit 423 may start count the second clock signal CLK2 from a time when the timer control signal CTL_TIMER is applied and generate the timer expiration signal S_TE when a counting value reaches a value corresponding to a length of the target time period (e.g., count value 15 from the INS_DLY or INF_CG information supplied to the timer circuit 423 by the control circuit 410). For example, the timer control signal CTL_TIMER may be a timer enable signal.

When an interrupt is not generated during the target time period, the switching circuit 421 may not output a clock pulse according to the switching control signal CTL_SW during the target time period. That is, the switching circuit 421 may cut off output of the first clock signal CLK1_IN during the target time period. Accordingly, with respect to the first clock signal CLK1_OUT output from the switching circuit 421, a clock pulse may not be generated during the target time period and a clock pulse may be generated during periods other than the target time period.

Figure 7:
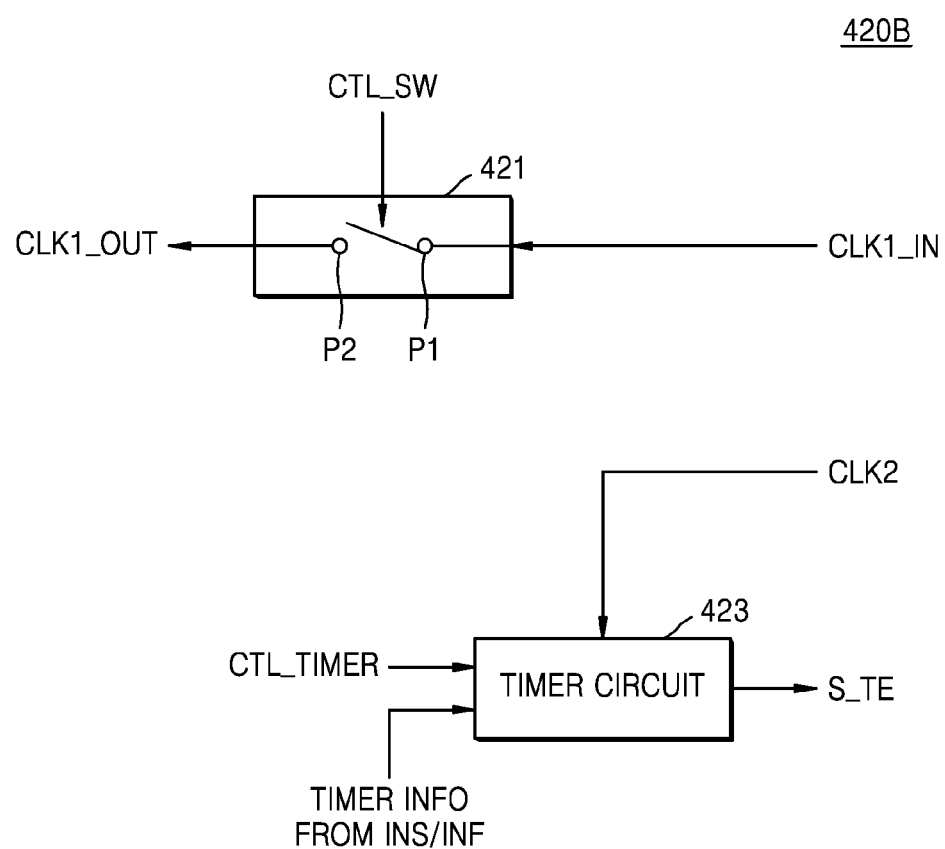
FIG. 7 illustrates a configuration of a clock gating circuit illustrated in FIG. 5, according to another example embodiment.

FIG. 7 illustrates another example 420B of a configuration of the clock gating circuit illustrated in FIG. 5.

Referring to FIG. 7, the clock gating circuit 420B may include a switching circuit 421 and a timer circuit 423.

The clock gating circuit 420B of FIG. 7 is configured to directly transmit a second clock signal CLK2 from the outside to the timer circuit 423, without using the clock divider 422 of the clock gating circuit 420 of FIG. 6. For example, the clock management units 120 of FIGS. 1 and 3 are capable of directly transmitting the external clock to the timer circuit 423 of the clock gating circuit 420B as the second clock signal CLK2. In this case, the second clock signal CLK2 may have a lower frequency than the first clock signal CLK1_IN.

Since the operations of the switching circuit 421 and the timer circuit 423 illustrated in FIG. 7 are substantially the same as the operations of the switching circuit 421 and the timer circuit 423 illustrated in FIG. 6, redundant descriptions thereof will be omitted.

Figure 8:
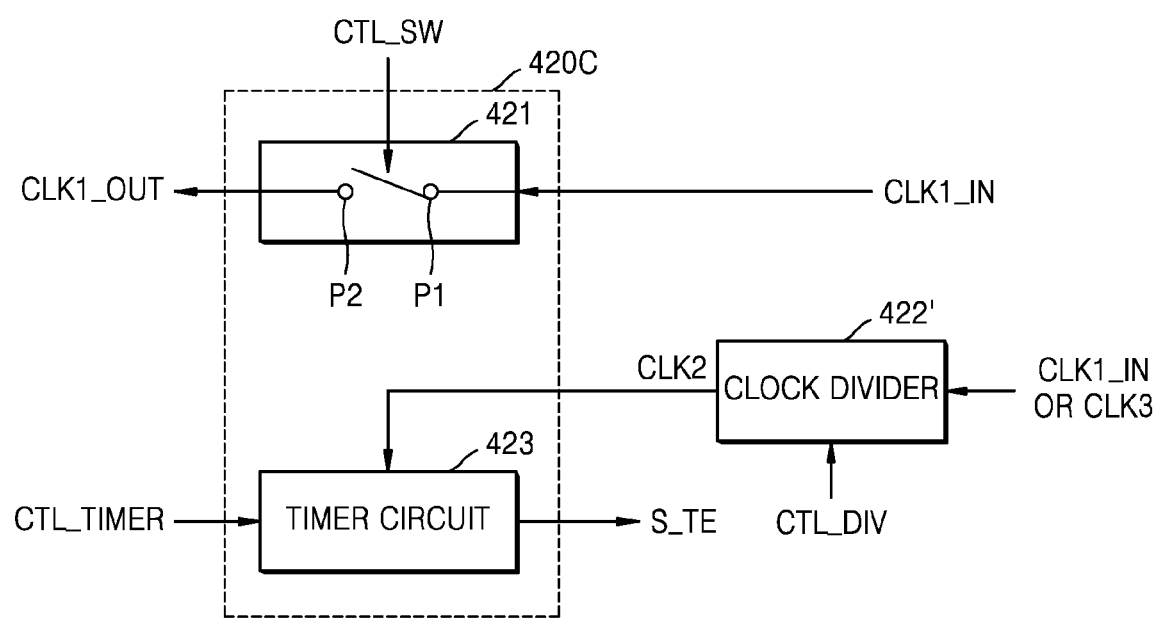
FIG. 8 illustrates a configuration of a clock gating circuit illustrated in FIG. 5, according to another example embodiment.

FIG. 8 illustrates another example 420C of a configuration of the clock gating circuit illustrated in FIG. 5.

Referring to FIG. 8, the clock gating circuit 420C may include a switching circuit 421 and a timer circuit 423.

According to the example embodiment of FIG. 8, a clock divider 422' is installed outside the clock gating circuit 420C. For example, in the clock gating circuit 420C constituting the clock management unit 120 of FIGS. 1 and 3, the clock divider 422' may be designed to be installed outside the processor 100A. The clock signal, which is input to the clock divider 422', may be the first clock signal CLK1_IN or the third clock signal CLK3. The third clock signal CLK3 may have a different frequency from the first clock signal CLK1_IN.

Since the operations of the switching circuit 421, the clock divider 422', and the timer circuit 423 illustrated in FIG. 8 are substantially the same as the operations of the switching circuit 421, the clock divider 422, and the timer circuit 423 illustrated in FIG. 6, redundant descriptions thereof will be omitted.

An operation of processing the delay instruction in the processor 100A or 100B of FIG. 1 or FIG. 2 according to various conditions and a clock gating processing operation in the clock management unit 120 or 300 will be described with reference to instruction pipeline state diagrams and waveform diagrams of main signals.

Figure 9:
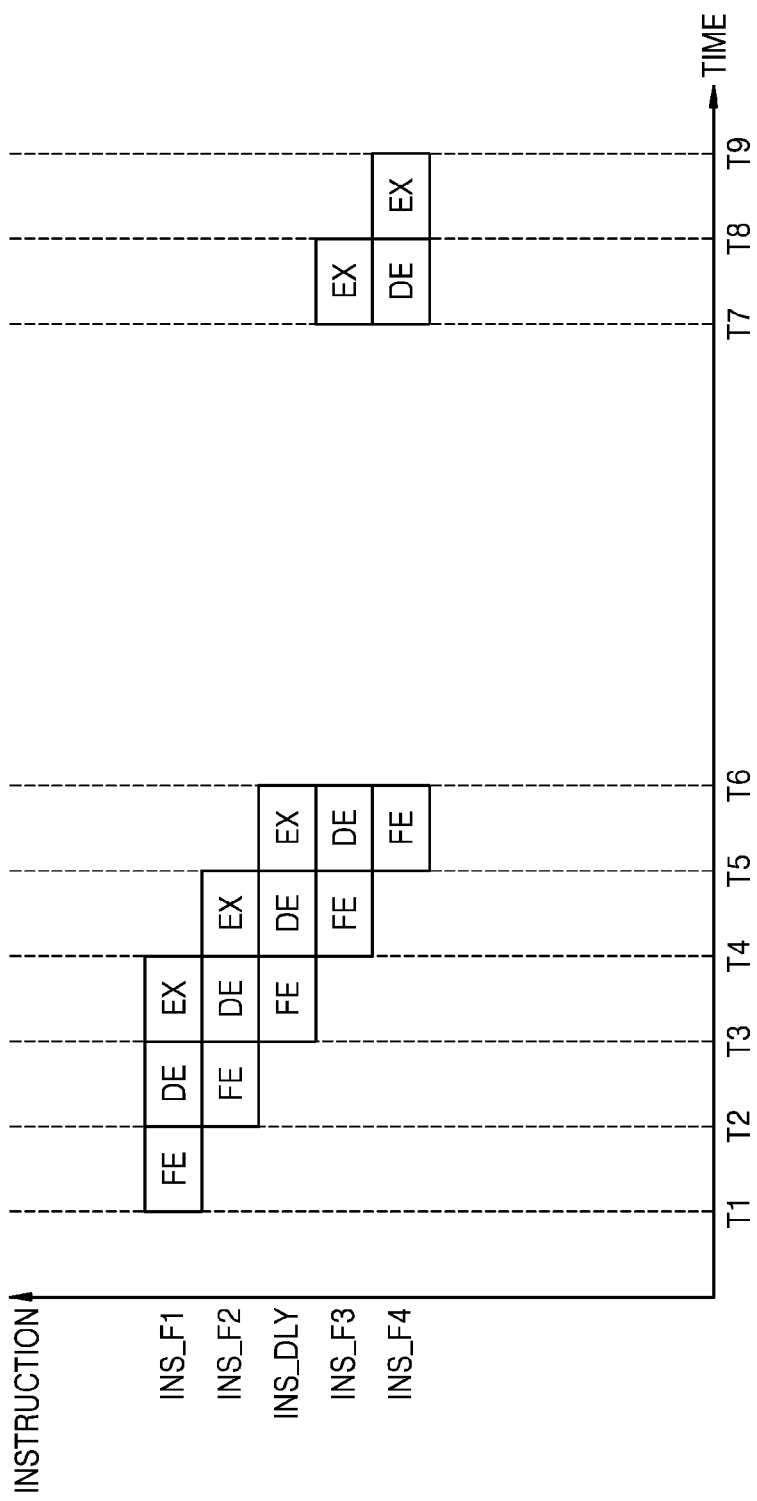
FIG. 9 is an instruction pipeline state diagram for describing a process of executing a delay instruction in a processor, according to another example embodiment.

FIG. 9 is an instruction pipeline state diagram for describing a process of performing a delay instruction in a processor according to an example embodiment.

Referring to FIG. 9, there is an instruction pipeline state diagram in which a delay period determined based on the delay instruction INS_DLY is a period between T6 and T7, and an interrupt is not generated during the period between T6 and T7 or, in the force gating field 13 of the delay instruction INS_DLY, information is set which supports a function of ignoring an interrupt even when the interrupt is generated during the time delay period upon execution of the delay instruction INS_DLY.

In a period between T1 and T2, an operation FE of fetching a first instruction INS_F1 is performed.

In a period between T2 and T3, an operation DE of decoding the first instruction INS_F1 and an operation of fetching a second instruction INS_F2 may be performed together.

In a period between T3 and T4, an operation EX of executing the first instruction INS_F1, an operation of decoding the second instruction INS_F2, and an operation of fetching the delay instruction INS_DLY may be performed together.

In a period between T4 and T5, an operation EX of executing the second instruction INS_F2, an operation of decoding the delay instruction INS_DLY, and an operation of fetching a third instruction INS_F3 may be performed together.

In a period between T5 and T6, an operation EX of executing the delay instruction INS_DLY, an operation of decoding the third instruction INS_F3, and an operation of fetching a fourth instruction INS_F4 may be performed together.

Since, in the force gating field 13, the information is set which supports the function of ignoring an interrupt even when the interrupt is generated during the time delay period upon execution of the delay instruction INS_DLY, the clock gating operation is performed based on the delay instruction INS_DLY regardless of whether the interrupt is generated during the period between T6 and T7. Therefore, in the period between T6 and T7, the clock pulse may be not transmitted to the core processor 110 or the processor 100B.

Figure 13:
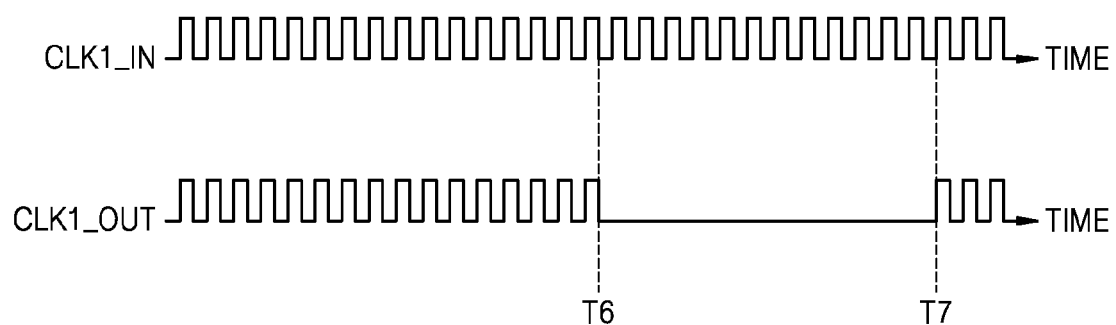
FIG. 13 is a state diagram of input/output clock signals of a clock management unit according to an example embodiment.

When the processor 100A or 100B processes an instruction based on the instruction pipeline state diagram as illustrated in FIG. 9, a waveform of the first clock signal CLK1_IN input to the clock management unit 120 or 300 and a waveform of the first clock signal CLK1_OUT output from the clock management unit 120 or 300 and transmitted to the core processor 110 and the processor 100B are illustrated in FIG. 13.

It can be seen from FIG. 13 that, with respect to first clock signal CLK1_OUT, a clock pulse is not generated during a period between T6 and T7. That is, the clock pulse may be not transmitted to the core processor 110 or the processor 100B during the period between T6 and T7.

Figure 14:
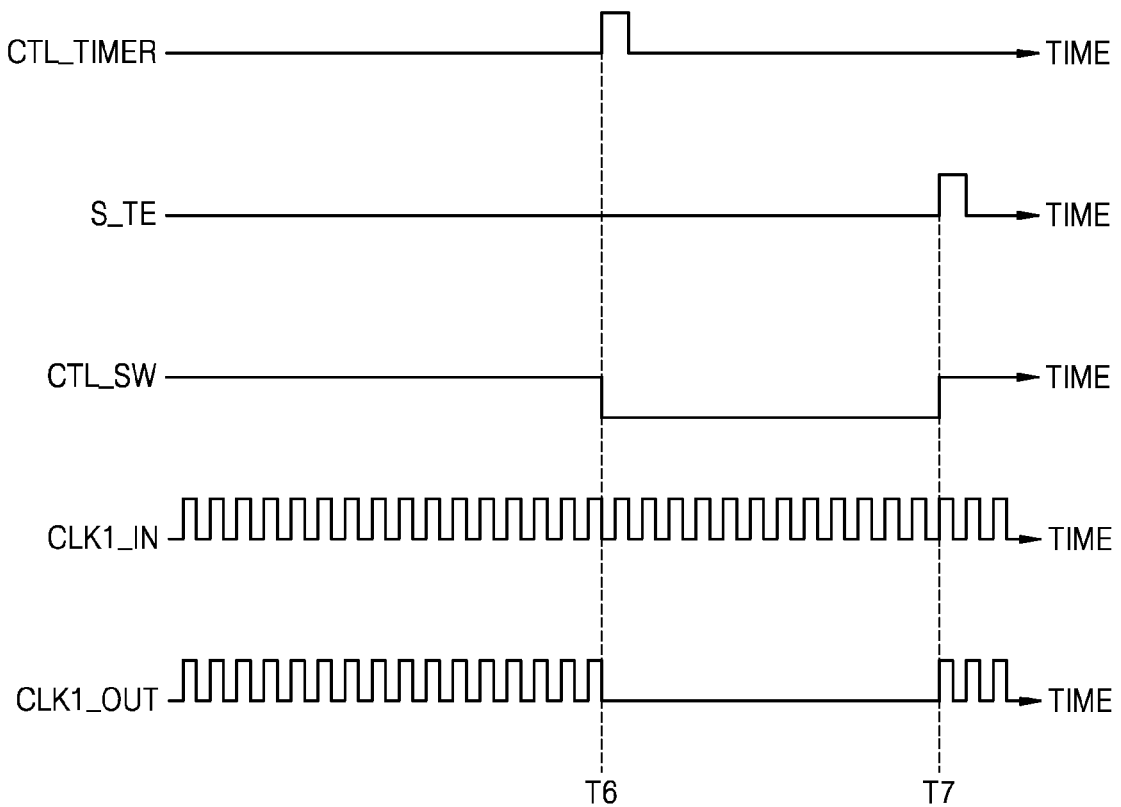
FIG. 14 is a waveform diagram of main signals of an integrated circuit including a clock management unit when a processor executes a delay instruction according to the instruction pipeline state as illustrated in FIG. 9.

When the processor 100A or 100B processes an instruction based on the instruction pipeline state diagram as illustrated in FIG. 9, a waveform diagram for main signals generated by the clock management unit 120 or 300 is illustrated in FIG. 14.

Referring to FIG. 14, a timer control signal CTL_TIMER may be generated at a time T6. Therefore, the timer circuit 423 may start a counting operation according to the timer control signal CTL_TIMER. At the time T6, the switching control signal CTL_SW may transition from a "HIGH" state to a "LOW" state. The switching control signal CTL_SW may maintain the "LOW" state until the timer expiration signal S_TE is generated. The switching control signal CTL_SW may transition from the "LOW" state to the "HIGH" state at a time T7 at which a timer expiration signal S_TE is generated.

Accordingly, in the period between T6 and T7 in which the switching control signal CTL_SW has the "LOW" state, the switching circuit 421 of the clock management unit 120 or 300 may be turned off, and in a period in which the switching control signal CTL_SW has the "HIGH" state, the switching circuit 421 may be turned on. Accordingly, in the period between T6 and T7, with respect to the first clock signal CLK1_OUT, a clock pulse may not be generated. Therefore, in the period between T6 and T7, the clock pulse may be not transmitted to the core processor 110 or the processor 100B.

Referring to FIG. 9 again, after the clock gating operation according to execution of the delay instruction INS_DLY is completed, an operation of executing the third instruction INS_F3 and an operation of decoding the fourth instruction INS_F4 may be performed together in a period between T7 and T8. As described above, the instruction pipeline structure may not be broken during execution of the delay instruction INS_DLY. That is, the processor 100A or 100B may recognize that the delay instruction INS_DLY is executed during the period between T6 and T7, which is the time delay period. After the clock gating operation according to execution of the delay instruction INS_DLY is completed, the processor 100A or 100B may perform the operations of executing the third instruction INS_F3 and decoding the fourth instruction INS_F4 in a period between T7 and T8. In a period between T8 and T9, an operation of executing the fourth instruction INS_F4 may be performed.

Figure 10:
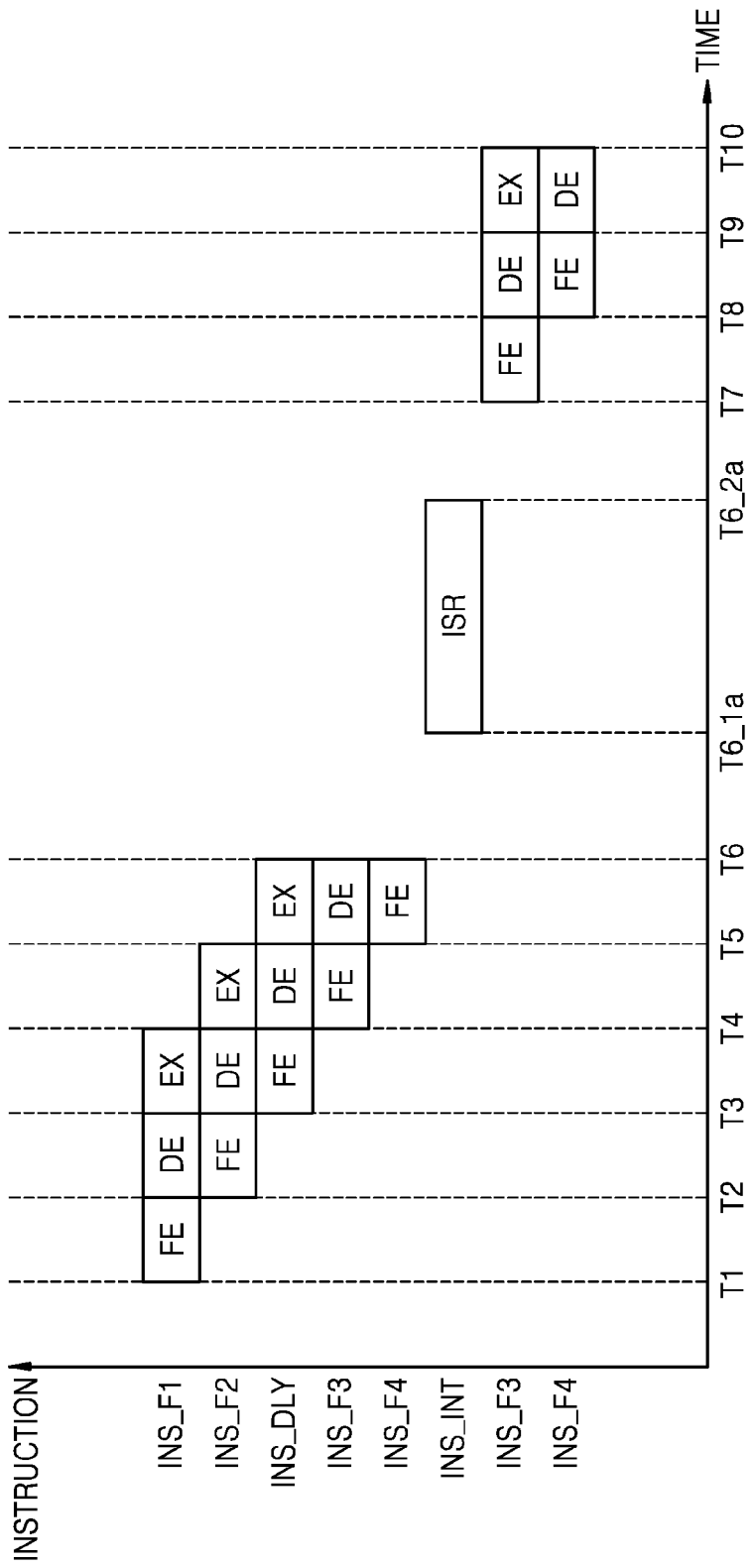
FIG. 10 is an instruction pipeline state diagram for describing a process of executing a delay instruction in a processor, according to another example embodiment.

FIG. 10 is an instruction pipeline state diagram for describing a process of performing a delay instruction in a processor according to another example embodiment.

Referring to FIG. 10, there is an instruction pipeline state diagram in which a delay period determined based on the delay instruction INS_DLY is a period between T6 and T7, an interrupt is generated during the period between T6 and T7, and, in the force gating field 13 of the delay instruction INS_DLY, information is set which does not support a function of ignoring an interrupt during the time delay period upon execution of the delay instruction INS_DLY.

The instruction pipeline state in a period between T1 and T6 as illustrated in FIG. 10 may be the same as the instruction pipeline state illustrated in FIG. 9.

In a period between T5 and T6, an operation EX of executing the delay instruction INS_DLY, an operation of decoding a third instruction INS_F3, and an operation of fetching a fourth instruction INS_F4 may be performed together.

Figure 15:
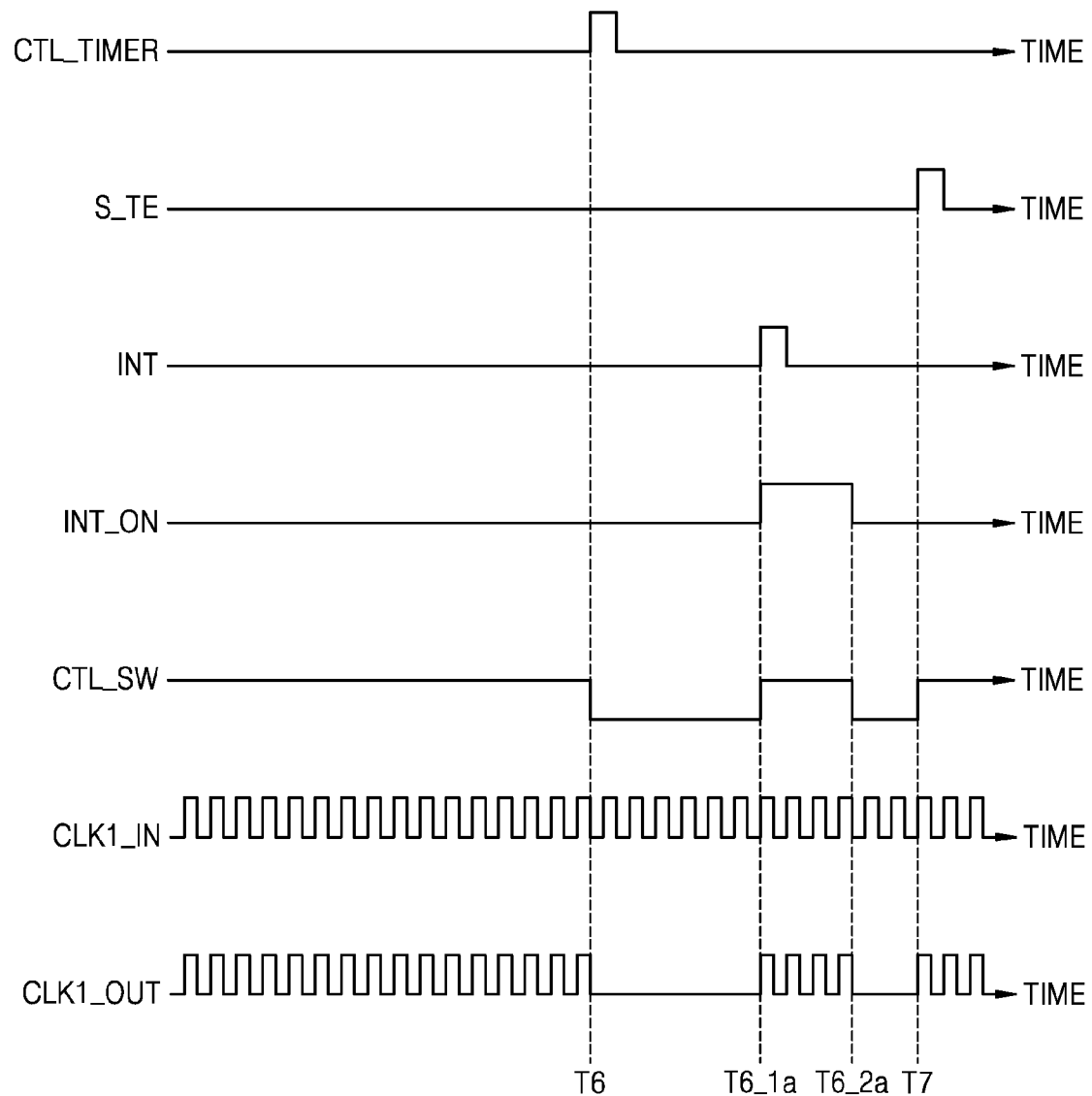
FIG. 15 is a waveform diagram of main signals of an integrated circuit including a clock management unit when a processor executes a delay instruction according to the instruction pipeline state as illustrated in FIG. 10.

When the processor 100A or 100B processes an instruction based on the instruction pipeline state diagram as in FIG. 10, a waveform diagram for main signals generated by the clock management unit 120 or 300 is illustrated in FIG. 15.

Referring to FIG. 15, a timer control signal CTL_TIMER may be generated at a time T6. Therefore, the timer circuit 423 may start a counting operation according to the timer control signal CTL_TIMER. At the time T6, the switching control signal CTL_SW may transition from a "HIGH" state to a "LOW" state. The switching control signal CTL_SW may maintain the "LOW" state until a time T6_1a at which an interrupt signal INT is generated. At the time T6_1a, the switching control signal CTL_SW may transition from the "LOW" state to the "HIGH" state. At the time T6_1a, an interrupt state signal INT_ON may transition from the "LOW" state to the "HIGH" state. The interrupt state signal INT_ON may maintain the "HIGH" state during a period between the time T6_1a and a time T6_2a, in which an interrupt task is executed.

The switching control signal CTL_SW may maintain the "HIGH" state during a period from the time T6_1a to the time T6_2a at which the interrupt state signal INT_ON transitions to the "LOW" state and the control signals CTL_SIGs indicate completion of the interrupt task. At the time T6_2a, the switching control signal CTL_SW may transition from the "HIGH" state to the "LOW" state. The switching control signal CTL_SW may maintain the "LOW" state until a timer expiration signal S_TE is generated. The switching control signal CTL_SW may transition from the "LOW" state to the "HIGH" state at a time T7 when the timer expiration signal S_TE is generated.

Accordingly, in a period between T6 and T6_1a and a period between T6_2a and T7, in which the switching control signal CTL_SW has the "LOW" state, the switching circuit 421 of the clock management unit 120 or 300 may be turned off, and in a period in which the switching control signal CTL_SW has the "HIGH" state, the switching circuit 421 is turned on.

In the period between T6 and T6_1a and the period between T6_2a and T7 among the period between T6 and T7 determined as a delay period, a clock pulse may not be generated from the first clock signal CLK1_OUT. Therefore, in the period between T6 and T6_1a and the period between T6_2a and T7, the clock pulse may be not transmitted to the core processor 110 or the processor 100B. In a period between T6_1a and T6_2a in which interrupt processing is performed due to generation of the interrupt, among the period between T6 and T7 determined as the delay period, the clock pulse may be generated as the first clock signal CLK1_OUT. Therefore, in the period between T6_1a and T6_2a, the clock pulse may be normally transmitted to the core processor 110 or the processor 100B.

Referring to FIG. 10 again, in the period between T6_1a and T6_2a among the period between T6 and T7 determined as the delay period based on the delay instruction INS_DLY, the core processor 110 or the processor 100B may execute an interrupt service routine ISR of processing an interrupt task according to an interrupt instruction INS_INT based on the generation of the interrupt.

After the clock gating operation according to execution of the delay instruction INS_DLY is completed, the core processor 110 or the processor 100B may perform an operation of fetching the third instruction INS_F3 in a period between T7 and T8. Since the interrupt service routine has been executed in the period between T6_1a and T6_2a, the operation of fetching the third instruction INS_F3 may be executed newly. In a period between T9 and T10, an operation of decoding the third instruction INS_F3 and an operation of fetching the fourth instruction INS_F4 may be performed together. In a period between T9 and T10, an operation of executing the third instruction INS_F3 and an operation of decoding the fourth instruction INS_F4 may be performed together.

Figure 11:
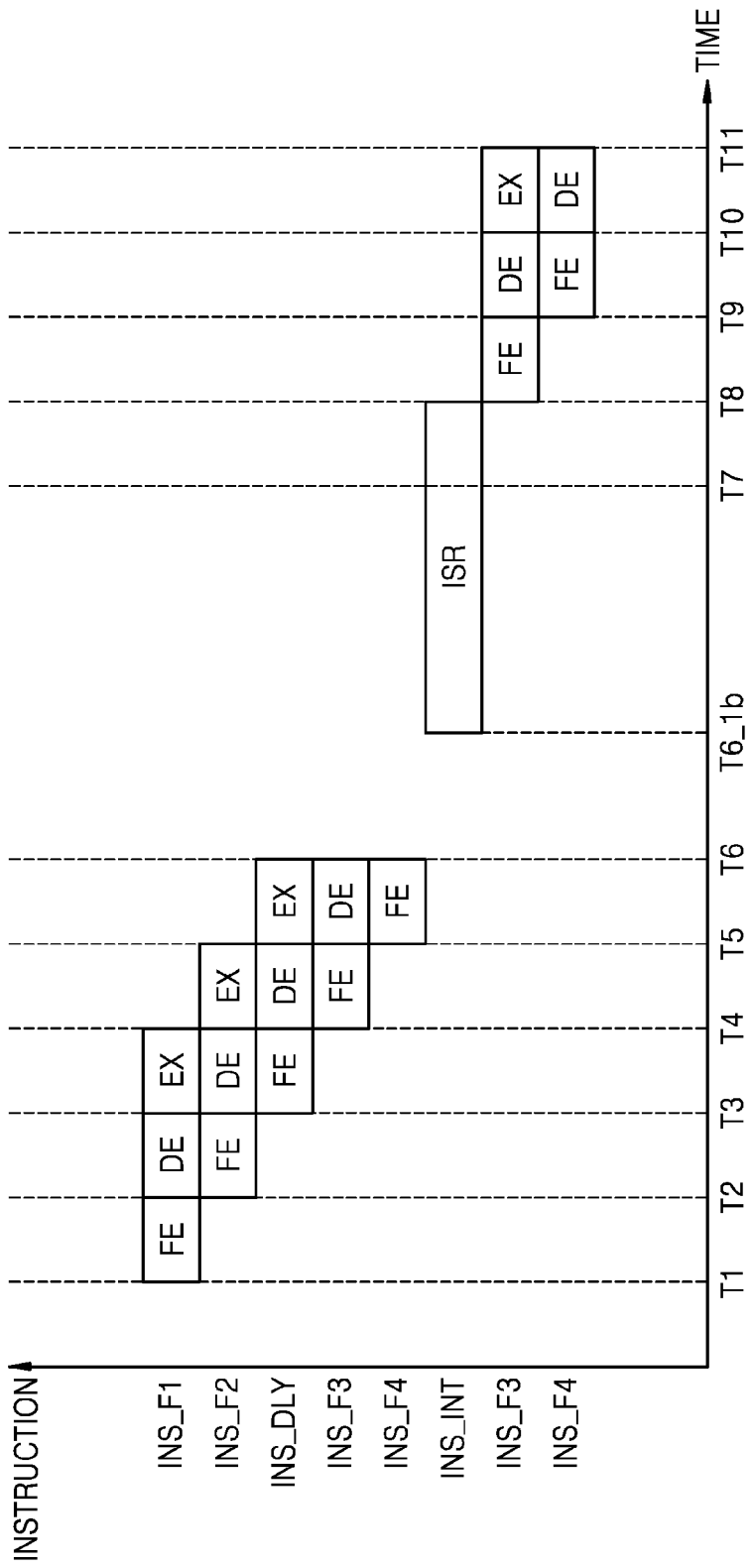
FIG. 11 is an instruction pipeline state diagram for describing a process of executing a delay instruction in a processor, according to another example embodiment.

FIG. 11 is an instruction pipeline state diagram for describing a process of executing a delay instruction in a processor, according to another example embodiment.

Referring to FIG. 11, there is an instruction pipeline state diagram in which a delay period determined based on the delay instruction INS_DLY is a period between T6 and T7, an interrupt is generated during the period between T6 and T7, an interrupt task generated during the period between T6 and T7 is completed after the delay period, and in the force gating field 13 of the delay instruction INS_DLY, information is set which does not support a function of ignoring an interrupt during the time delay period upon execution of the delay instruction INS_DLY.

The instruction pipeline state in the period between T1 and T6 as illustrated in FIG. 11 may be the same as the instruction pipeline state illustrated in FIG. 7.

In the period between T5 and T6, an operation EX of executing the delay instruction INS_DLY, an operation of decoding the third instruction INS_F3, and an operation of fetching the fourth instruction INS_F4 may be performed together.

Figure 16:
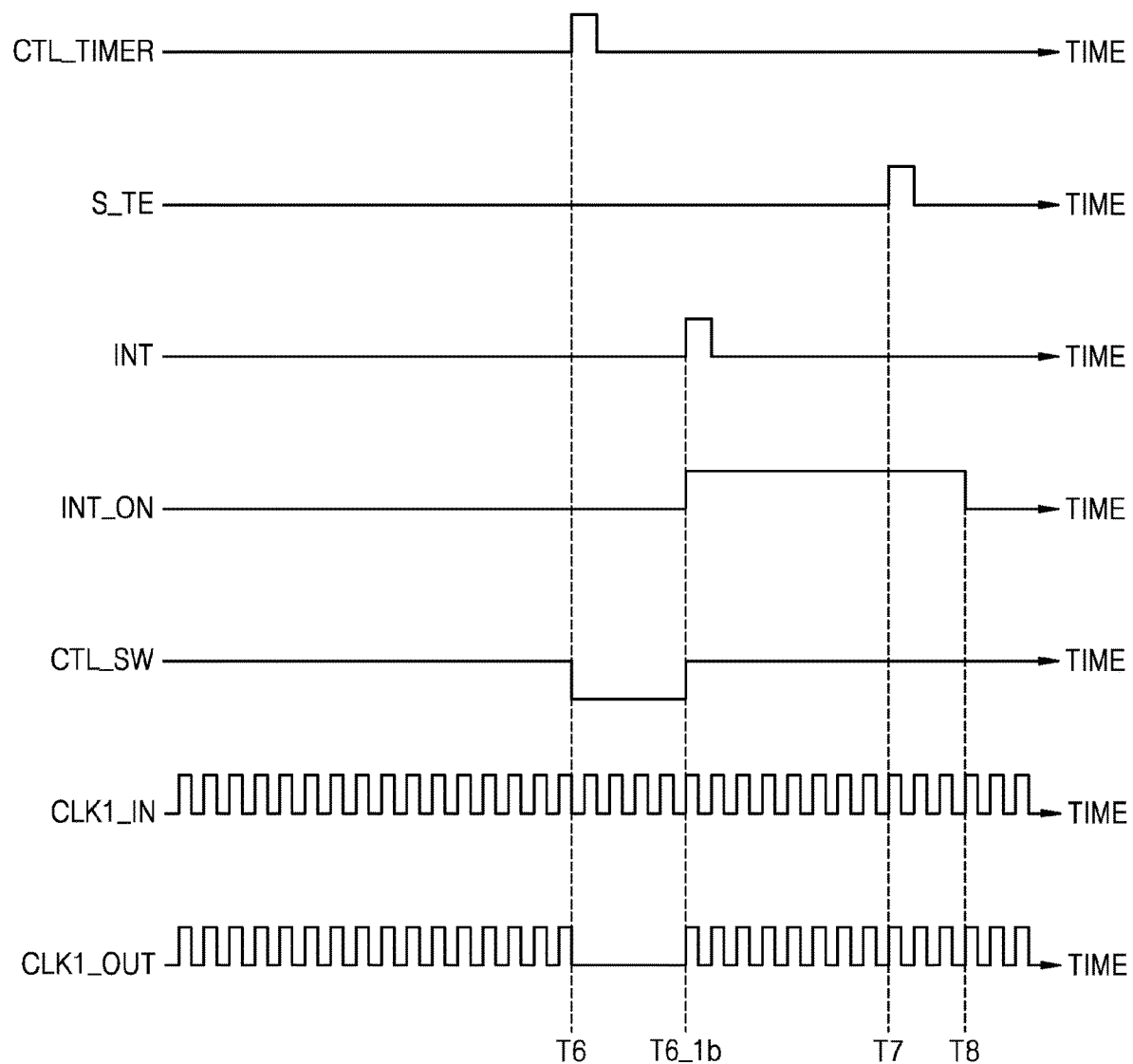
FIG. 16 is a waveform diagram of main signals of an integrated circuit including a clock management unit when a processor executes a delay instruction according to the instruction pipeline state as illustrated in FIG. 11.

When the processor 100A or 100B processes instructions based on the instruction pipeline state diagram as illustrated in FIG. 11, a waveform diagram for main signals generated by the clock management unit 120 or 300 is illustrated in FIG. 16.

Referring to FIG. 16, a timer control signal CTL_TIMER may be generated at a time T6. Therefore, the timer circuit 423 may start a counting operation according to the timer control signal CTL_TIMER. At the time T6, the switching control signal CTL_SW may transition from a "HIGH" state to a "LOW" state. The switching control signal CTL_SW may maintain the "LOW" state until a time T6_1b at which an interrupt signal INT is generated. At the time T6_1b, the switching control signal CTL_SW may transition from the "LOW" state to the "HIGH" state. At the time T6_1b, the interrupt state signal INT_ON may transition from the "LOW" state to the "HIGH" state. The interrupt state signal INT_ON may maintain the "HIGH" state during a period between the time T6_1b and a time T8, in which an interrupt task is executed.

Since the time T8 at which the interrupt state signal INT_ON, representing a time when the interrupt task is completed, transitions from the "HIGH" state to the "LOW" state is later than the time T7, the switching control signal CTL_SW may maintain the "HIGH" state until the delay instruction INS_DLY is executed from the time T6_1b.

Accordingly, in the period between T6 and T6_1b in which the switching control signal CTL_SW has the "LOW" state, the switching circuit 421 of the clock management unit 120 or 300 may be turned off, and in a period in which the switching control signal CTL_SW has the "HIGH" state, the switching circuit 421 may be turned on.

In the period between T6 and T6_1b of the period between T6 and T7 determined as a delay period, a clock pulse may not be generated as the first clock signal CLK1_OUT. Therefore, in the period between T6 and T6_1b, the clock pulse may be not transmitted to the core processor 110 or the processor 100B. In the period between T6_1b and T7 in which interrupt processing is performed due to generation of the interrupt among the period between T6 and T7 determined as the delay period, the clock pulse may be generated as the first clock signal CLK1_OUT. Therefore, in the period between T6_1b and T7, the clock pulse may be normally transmitted to the core processor 110 or the processor 100B.

Referring to FIG. 11 again, in the period between T6_1b and T7 among the period between T6 and T7 determined as the delay period based on the delay instruction INS_DLY, the core processor 110 or the processor 100B may execute an interrupt service routine ISR of processing an interrupt task according to the interrupt instruction INS_INT based on the generation of the interrupt.

Since the interrupt task generated in the period between T6 and T7 is not completed at T7, the core processor 110 or the processor 100B may continuously execute the interrupt service routine ISR until the time T8.

After execution of the interrupt service routine ISR is completed, the core processor 110 or the processor 100B may perform an operation of fetching the third instruction INS_F3 in a period between T8 and T9. Since the interrupt service routine has been executed in a period between T6_1a and T8, the operation of fetching the third instruction INS_F3 may be executed newly. In a period between T9 and T10, an operation of decoding the third instruction INS_F3 and an operation of fetching a fourth instruction INS_F4 may be performed together. In a period between T10 and T11, an operation of executing the third instruction INS_F3 and an operation of decoding the fourth instruction INS_F4 may be performed together.

Figure 12:
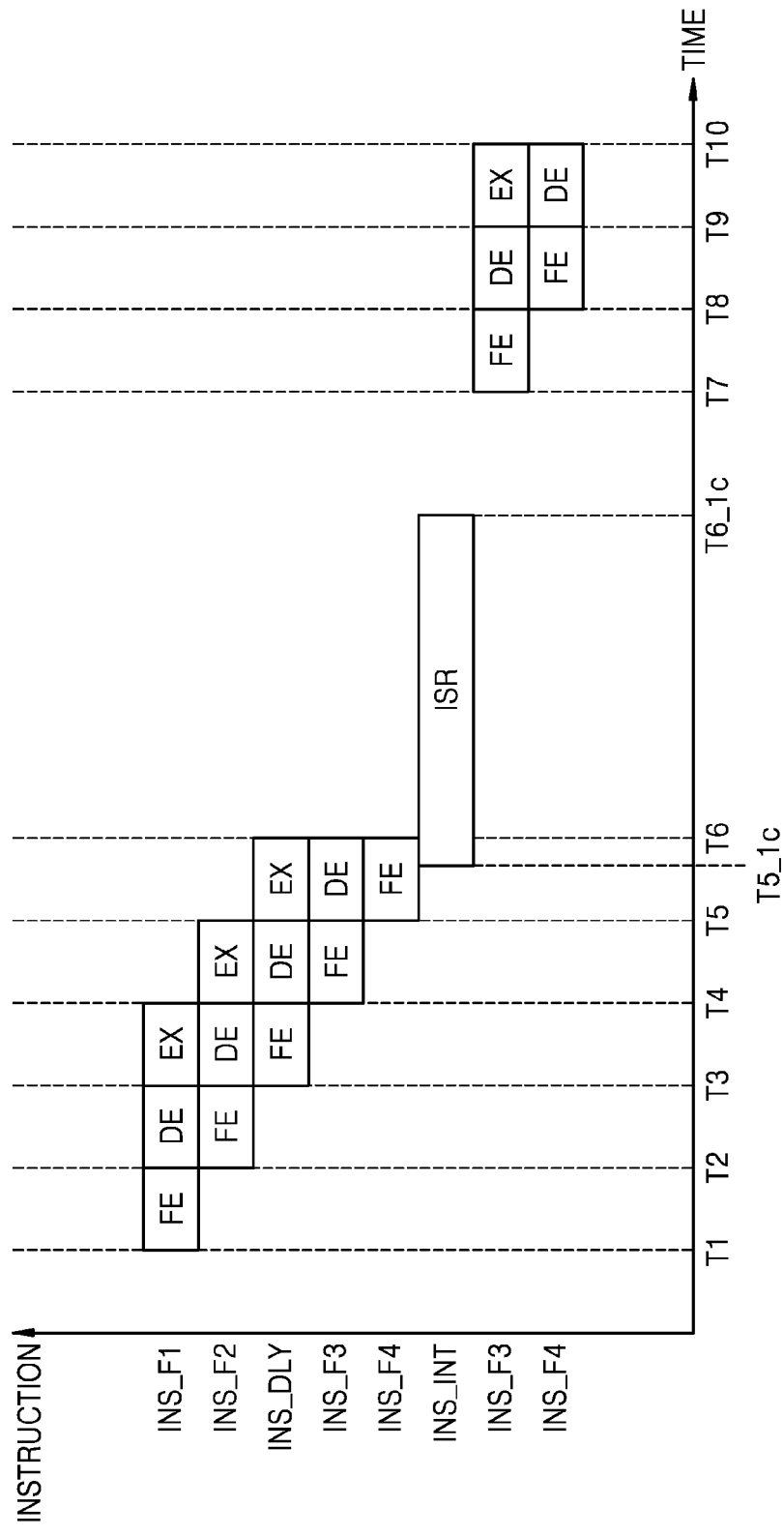
FIG. 12 is an instruction pipeline state diagram for describing a process of executing a delay instruction in a processor, according to another example embodiment.

FIG. 12 is an instruction pipeline state diagram for describing a process of executing a delay instruction in a processor, according to another example embodiment.

Referring to FIG. 12, there is an instruction pipeline state diagram in which a delay period determined based on the delay instruction INS_DLY is a period between T6 and T7, an interrupt is generated during the period between T6 and T7 in which the delay instruction INS_DLY is executed, and, in the force gating field 13 of the delay instruction INS_DLY, information is set which does not support a function of ignoring an interrupt during the time delay period upon execution of the delay instruction INS_DLY.

The instruction pipeline state in the period between T1 and T5 as illustrated in FIG. 12 may be the same as the instruction pipeline state illustrated in FIG. 9.

Referring to FIG. 12, in a period between T5 and T6, an operation EX of executing the delay instruction INS_DLY, an operation of decoding the third instruction INS_F3, and an operation of fetching a fourth instruction INS_F4 may be performed together. In the period between T5 and T6 in which the delay instruction INS_DLY is executed, an interrupt may be generated. That is, the interrupt may be generated during a period from the time T5 at which execution of the delay instruction INS_DLY is started to the time T6 at which execution of an clock gating operation is started.

Figure 17:
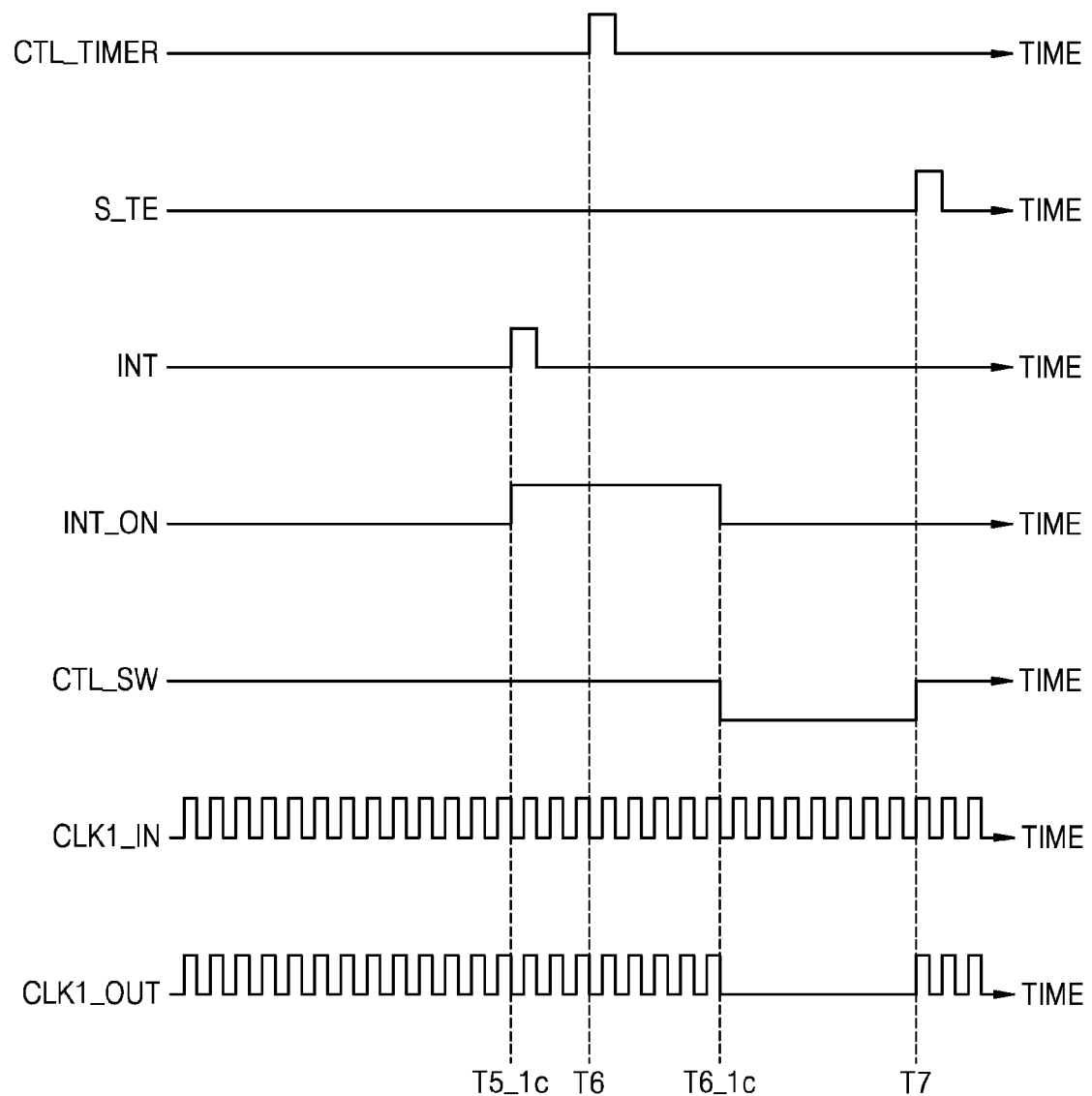
FIG. 17 is a waveform diagram of main signals of an integrated circuit including a clock management unit when a processor executes a delay instruction according to the instruction pipeline state as illustrated in FIG. 12.

When the processor 100A or 100B processes an instruction based on the instruction pipeline state diagram as in FIG. 12, a waveform diagram for main signals generated by the clock management unit 120 or 300 is illustrated in FIG. 17.

Referring to FIG. 17, an interrupt signal INT may be generated at the time T5_1c and an interrupt state signal INT_ON may transition from a "LOW" state to a "HIGH" state at the time T5_1c. Therefore, the core processor 110 or the processor 100B may execute an interrupt service routine ISR based on an interrupt signal generated at the time T5_1c.

In addition, the clock management unit 120 or 300 may perform an operation for clock gating processing according to execution of the delay instruction INS_DLY. That is, the timer circuit 423 may start a counting operation according to a timer control signal CTL_TIMER.

Since the interrupt state signal INT_ON is in the "HIGH" state at the time T6, the switching control signal CTL_SW may maintain the "HIGH" state as is. That is, the switching control signal CTL_SW may not transition from the "HIGH" state to the "LOW" state at the time T6.

The interrupt state signal INT_ON may maintain the "HIGH" state during a period between the time T5_1c and the time T6_1c, in which the interrupt task is executed. Since the time T6_1c at which the interrupt task is completed is within the period between T6 and T7 that is the delay period determined based on the delay instruction INS_DLY, the switching control signal CTL_SW may transition from the "HIGH" state to the "LOW" state at the time T6_1c.

The switching control signal CTL_SW may maintain the "LOW" state until the timer expiration signal S_TE. The switching control signal CTL_SW may transition from the "LOW" state to the "HIGH" state at a time T7 when the timer expiration signal S_TE is generated.

Accordingly, in the period between T6_1c and T7 in which the switching control signal CTL_SW has the "LOW" state, the switching circuit 421 of the clock management unit 120 or 300 may be turned off, and in a period in which the switching control signal CTL_SW has the "HIGH" state, the switching circuit 421 may be turned on.

In the period between T6_1c and T7 of the period between T6 and T7 determined as a delay period, a clock pulse may not be generated as the first clock signal CLK1_OUT. Therefore, in the period between T6_1c and T7, the clock pulse may be not transmitted to the core processor 110 or the processor 100B. In the period between T6 and T6_1c in which interrupt processing is performed due to generation of the interrupt among the period between T6 and T7 determined as the delay period, the clock pulse may be generated as the first clock signal CLK1_OUT. Therefore, in the period between T6 and T6_1c, the clock pulse may be normally transmitted to the core processor 110 or the processor 100B.

Referring to FIG. 12 again, in the period between T6 and T6_1c among the period between T6 and T7 determined as the delay period based on the delay instruction INS_DLY, the core processor 110 or the processor 100B may execute an interrupt service routine ISR of processing an interrupt task according to the interrupt instruction INS_INT based on the generation of the interrupt. That is, the core processor 110 or the processor 100B may execute an interrupt service routine ISR in the period between T5_1c and T6_1c.

After a clock gating operation according to execution of the delay instruction INS_DLY is completed, the core processor 110 or the processor 100B may perform an operation of fetching the third instruction INS_F3 in a period between T7 and T8. Since the interrupt service routine has been executed in a period between T5_1c and T6_1c, the operation of fetching the third instruction INS_F3 may be executed newly. In a period between T9 and T10, an operation of decoding a third instruction INS_F3 and an operation of fetching a fourth instruction INS_F4 may be performed together. In a period between T9 and T10, an operation of executing the third instruction INS_F3 and an operation of decoding the fourth instruction INS_F4 may be performed together.

A clock management method that is performed in various types of integrated circuits, including an integrated circuit as illustrated in FIGS. 1 and 2, will be described. For inconvenience of description, the clock management method will be described below with reference to the integrated circuit of FIG. 2.

Figure 18:
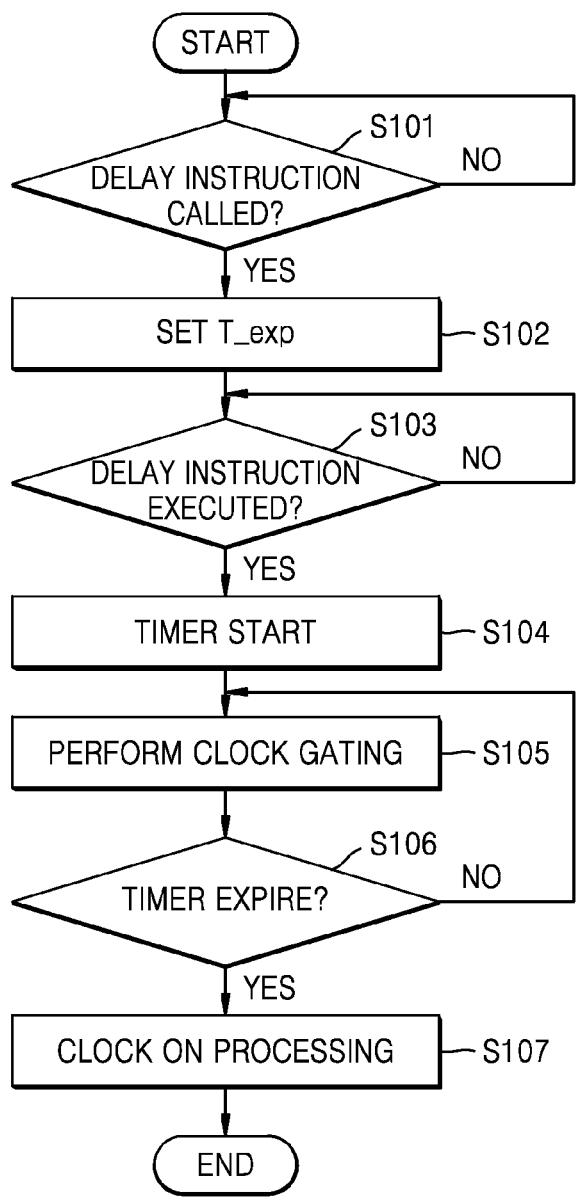
FIG. 18 is a flowchart of a clock management method which is performed in an integrated circuit, according to an example embodiment.

FIG. 18 is a flowchart of a clock management method that is performed in an integrated circuit, according to an example embodiment.

Referring to FIG. 18, there is an instruction pipeline state diagram in which an interrupt is not generated during a delay period determined based on the delay instruction INS_DLY and, in the force gating field 13 of the delay instruction INS_DLY, information is set which supports a function of ignoring an interrupt even when the interrupt is generated during the time delay period upon execution of the delay instruction INS_DLY.

In operation S101, the processor 100B may determine whether a delay instruction INS_DLY is called. For example, the delay instruction INS_DLY is called when there is a period in which a processor waits while executing no operation.

In operation S102, when the delay instruction INS_DLY is called in the processor 100B, the control circuit 410 of the clock management unit 300 may set a timer expiration time T_exp. For example, the control circuit 410 may set the timer expiration time T_exp based on the delay instruction INS_DLY received from the processor 100B or clock control factor information INF_CG generated by decoding the delay instruction INS_DLY.

In operation S103, the control circuit 410 of the clock management unit 300 may determine whether the delay instruction INS_DLY is executed in the processor 100B.

In operation S104, when the delay instruction INS_DLY is executed in the processor 100B, the timer circuit 423 of the clock management unit 300 may start a time measurement operation. For example, when the delay instruction INS_DLY is executed, the time measurement operation may be started by starting an operation of counting a clock signal having a lower frequency than a clock frequency used by the processor 100B.

In operation S105, the clock management unit 300 may perform a clock gating operation in the switching circuit 421 after the timer circuit 423 starts the time measurement operation. Alternatively, the clock gating operation in the switching circuit 421 may be performed simultaneously with start of the time measurement operation in the timer circuit 423. The clock gating operation may be an operation of cutting off transmission of a clock signal to the processor 100B. Therefore, a clock pulse may be not detected at a clock input terminal of the processor 100B in a period in which the clock gating operation is performed.

In operation S106, the control circuit 410 of the clock management unit 300 may determine whether a time measured by the timer circuit 423 reaches the timer expiration time T_exp.

When the time measured by the timer circuit 423 doses not reach the timer expiration time T_exp, the clock gating operation of cutting off transmission of the clock signal to the processor 100B may be continuously performed.

In operation S107, when the time measured by the timer circuit 423 reaches the timer expiration time T_exp, clock on processing of transmitting the clock signal to the processor 100B may be executed. Therefore, when the timer expiration time T_exp is reached, the clock signal may be normally transmitted to the processor 100B. That is, when the timer expiration time T_exp is reached, a clock pulse may be detected at the clock input terminal of the processor 100B.

Figure 19:
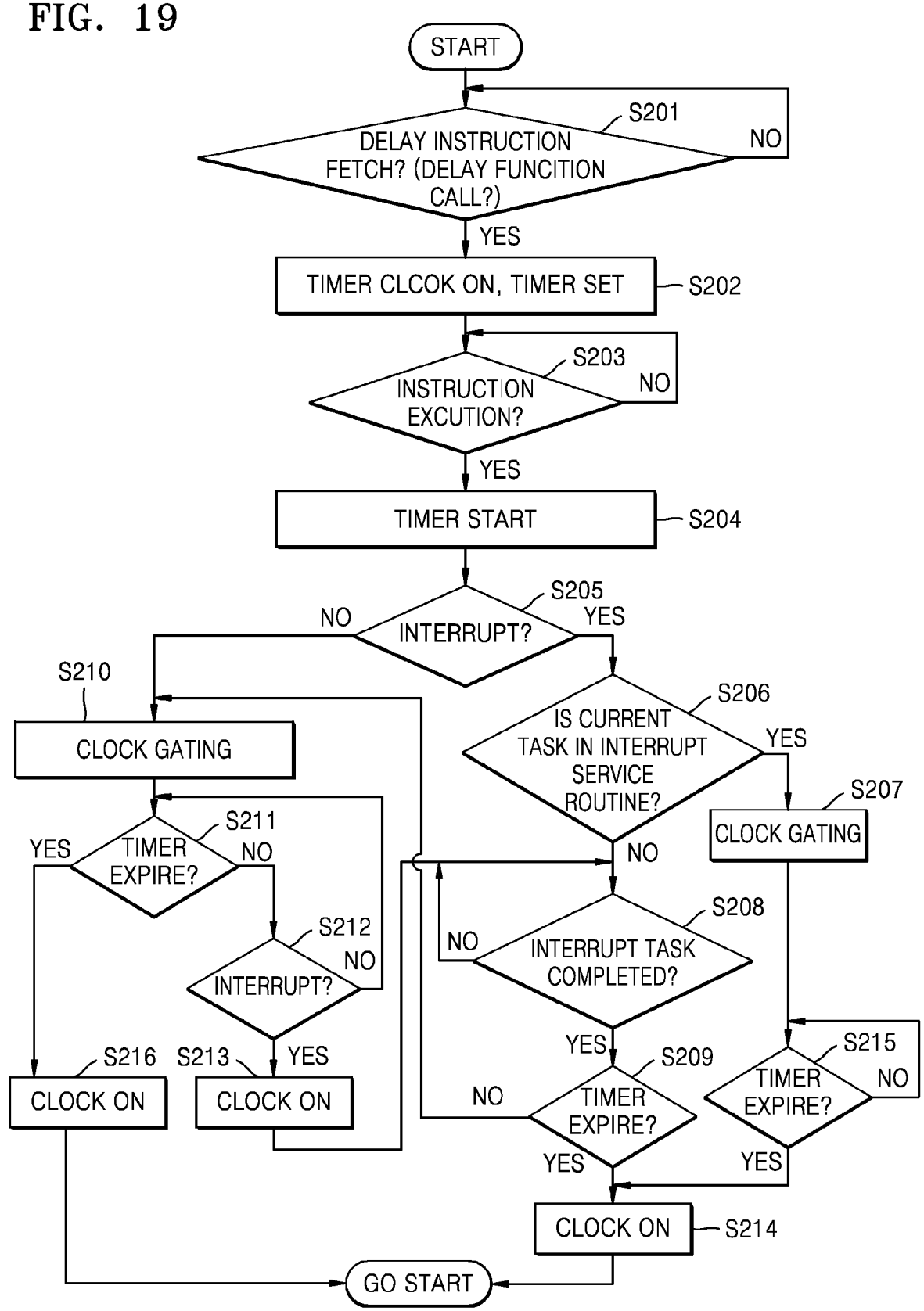
FIG. 19 is a flowchart of a clock management method which is performed in an integrated circuit, according to another example embodiment.

FIG. 19 is a flowchart of a clock management method which is performed in an integrated circuit, according to another example embodiment.

FIG. 19 is the flowchart of the clock management method in a case where, in the force gating field 13 of the delay instruction INS_DLY, information is set which does not support a function of ignoring an interrupt even when the interrupt is generated during the time delay period upon execution of the delay instruction INS_DLY In operation S201, the processor 100B may determine whether a delay instruction INS_DLY is called. For example, the delay instruction INS_DLY is called when there is a period in which a processor waits while executing no operation.

In operation S202, when the delay instruction INS_DLY is called in the processor 100B, the control circuit 410 of the clock management unit 300 may set a timer expiration time T_exp. For example, the control circuit 410 may set the timer expiration time T_exp based on the delay instruction INS_DLY received from the processor 100B or clock control factor information INF_CG generated by decoding the delay instruction INS_DLY.

In operation S203, the control circuit 410 of the clock management unit 300 may determine whether the delay instruction INS_DLY is executed in the processor 100B.

In operation S204, when the delay instruction INS_DLY is executed in the processor 100B, the timer circuit 423 of the clock management unit 300 receives a notification from the processor and may start a time measurement operation. For example, when the delay instruction INS_DLY is executed, the time measurement operation may be started by starting an operation of counting a clock signal having a lower frequency than a clock frequency used by the processor 100B.

In operation S205, after the time measurement operation is started, the clock management unit 300 may determine whether the processor 100B is in an interrupt state before performing the clock gating operation.

In operation S206, when the processor 100B is in the interrupt state, the clock management unit 300 may determine whether a task that is being executed is on an interrupt service routine ISR.

In operation S207, when the task that is being executed is on the interrupt service routine ISR, the clock management unit 300 may perform the clock gating operation. That the task which is being executed is on the interrupt service routine ISR may mean that the delay instruction INS_DLY is being executed on an interrupt service. Accordingly, the clock gating operation of cutting off transmission of the clock signal to the processor 100B may be performed based on execution of the delay instruction INS_DLY.

In operation S215, it is determined whether the timer circuit 423 has reached the timer expiration tine T_exp. If not, operation S215 is repeated. If so, then processing proceeds to operation S214.

In operation S208, when the task that is being executed is not on the interrupt service routine ISR, the clock management unit 300 may determine whether an interrupt task is completed. That is, when the task, which is being executed, is not on the interrupt service routine ISR, this means that an interrupt is generated in a period between T5 and T6 in which the delay instruction INS_DLY is executed as illustrated in FIG. 10. In this case, the clock gating operation is suspended until the interrupt task is completed.

In operation S209, when it is determined that the interrupt task is completed in operation S208, the clock management unit 300 may determine whether a time measured by the timer circuit 423 reaches the timer expiration time T_exp.

In operation S214, when it is determined that the time measured by the timer circuit 423 reaches the timer expiration time T_exp in operation S209, the clock management unit 300 may maintain execution of clock on processing for transmitting the clock signal to the processor 100B.

When it is determined that the time measured by the timer circuit 423 does not reach the timer expiration time T_exp in operation S209, the clock management unit 300 may perform the clock gating operation of cutting off transmission of the clock signal to the processor 100B in operation S210.

In operation S211, the clock management unit 300 may determine whether the time measured by the timer circuit 423 reaches the timer expiration time T_exp while performing the clock gating operation.

In operation S212, when it is determined that the time measured by the timer circuit 423 does not reach the timer expiration time T_exp in operation S211, the clock management unit 300 may determine whether an interrupt is requested from the processor 100B. For example, when an interrupt signal is received by the clock management unit 300, it may be determined that the interrupt is requested from the processor 100B.

When it is determined that the interrupt is not requested in operation S212, the clock management unit 300 may determine whether the timer expiration time T_exp is reached in operation S211 while performing the clock gating operation.

When it is determined that the interrupt is requested in operation S212, the clock management unit 300 may perform clock on processing from transmitting the clock signal to the processor 100B in operation S213.

After performing clock on processing, the clock management unit 300 may perform operation S208 of determining whether an interrupt task for the requested interrupt is completed.

When it is determined that the time measured by the timer circuit 423 reaches the timer expiration time T_exp in operation S211, the clock management unit 300 may perform the clock on processing of transmitting the clock signal to the processor 100B in operation S216.

Figure 20:
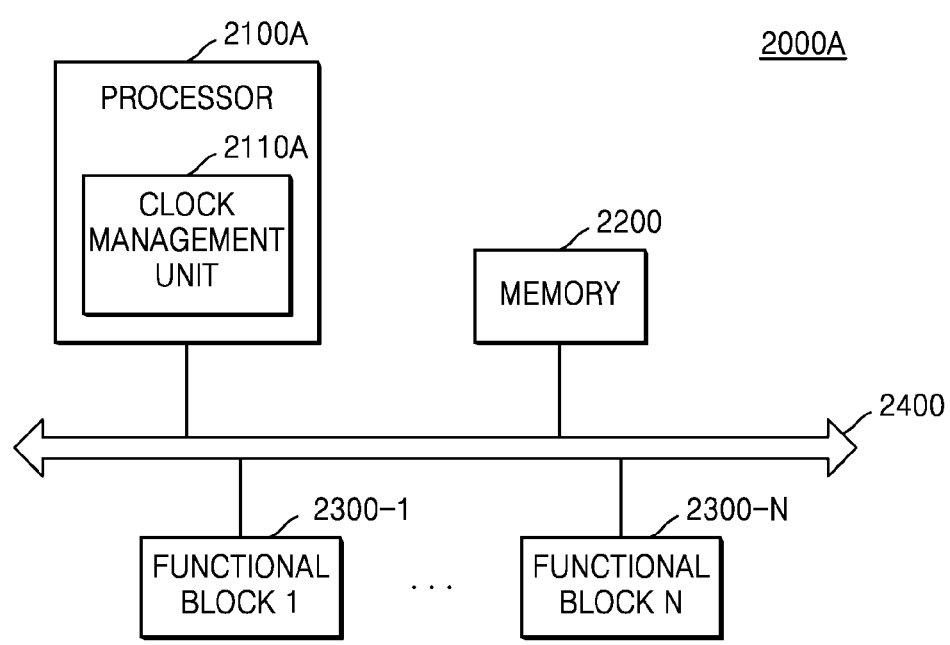
FIG. 20 illustrates a configuration of a system on chip to which a clock management unit is applied, according to an example embodiment.

FIG. 20 illustrates a configuration of a system on chip 2000A to which a clock management unit is applied, according to an example embodiment.

Referring to FIG. 20, the system on chip 2000A may include a processor 2100A including an embedded clock management unit 2110A, a memory 2200, a plurality of functional blocks 2300-1 to 2300-N, and a bus 2400.

The processor 2100A may control operations of the memory 2200 and the plurality of functional blocks 2300-1 to 2300-N connected thereto through the bus 2400. The processor 2100A may be applicable to a smart phone, a tablet personal computer (PC), a digital camera, a mobile device, a set-top box, a smart card system, a server system, and other various electronic devices.

For example, when execution of a time delay function is performed, the processor 2100A may perform an instruction fetch operation of reading a delay instruction INS_DLY from the memory 2200 and storing the delay instruction INS_DLY in an instruction register of the processor 2100A. The processor 2100A may decode and execute the delay instruction INS_DLY stored in the instruction register.

The clock management unit 120 as described with reference to FIG. 1 may be used as the clock management unit 2110A. Therefore, the clock management unit 2110A may perform a clock gating operation during a time delay period when the delay instruction INS_DLY is executed by the processor 2100A.

The memory 2200 may include an SRAM or DRAM that stores instructions, data or program codes that are necessary for an operation of the system on chip 2000A. The memory 2200 may include an non-volatile memory. The instructions stored in the memory 2200 may include the delay instruction INS_DLY that performs a delay function according to example embodiments. For example, the delay instruction INS_DLY may have the same structure as illustrated in FIG. 4

The functional blocks 2300-1 to 2300-N may be blocks that perform various functions supporting the system on chip 2000A. For example, the functional blocks 2300-1 to 2300-N may include a modem, a memory controller, a digital signal processor, a universal serial bus controller, a peripheral computer interconnect interface, or the like.

Figure 21:
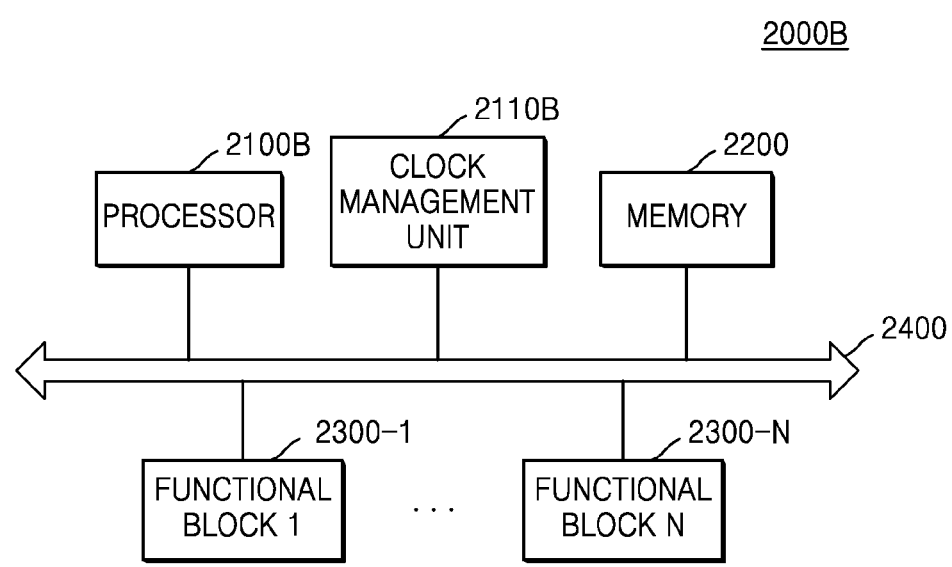
FIG. 21 illustrates a configuration of a system on chip to which a clock management unit is applied, according to another example embodiment.

FIG. 21 illustrates a configuration of a system on chip 2000B to which a clock management unit is applied, according to an example embodiment.

Referring to FIG. 21, the system on chip 2000B may include a processor 2100B, a clock management unit 2110B, a memory 2200, a plurality of functional blocks 2300-1 to 2300-N, and a bus 2400.

Since the memory 2200 and the plurality of functional blocks 2300-1 to 2300-N have been described with reference to FIG. 20, redundant descriptions thereof will be omitted.

The processor 2100B may control operations of the clock management unit 2110, the memory 2200, and the plurality of functional blocks 2300-1 to 2300-N connected thereto through the bus 2400. The processor 2100B may be applicable to a smart phone, a tablet personal computer (PC), a digital camera, a mobile device, a set-top box, a smart card system, a server system, and other various electronic devices.

For example, when execution of a time delay function is performed, the processor 2100B may perform an instruction fetch operation of reading a delay instruction INS_DLY from the memory 2200 and storing the delay instruction INS_DLY in an instruction register of the processor 2100B. The processor 2100B may decode and execute the delay instruction INS_DLY stored in the instruction register.

The clock management unit 300 as described with reference to FIG. 2 may be used as the clock management unit 2110B. Therefore, the clock management unit 2110B may perform a clock gating operation during a time delay period when the delay instruction INS_DLY is executed by the processor 2100B.

Figure 22:
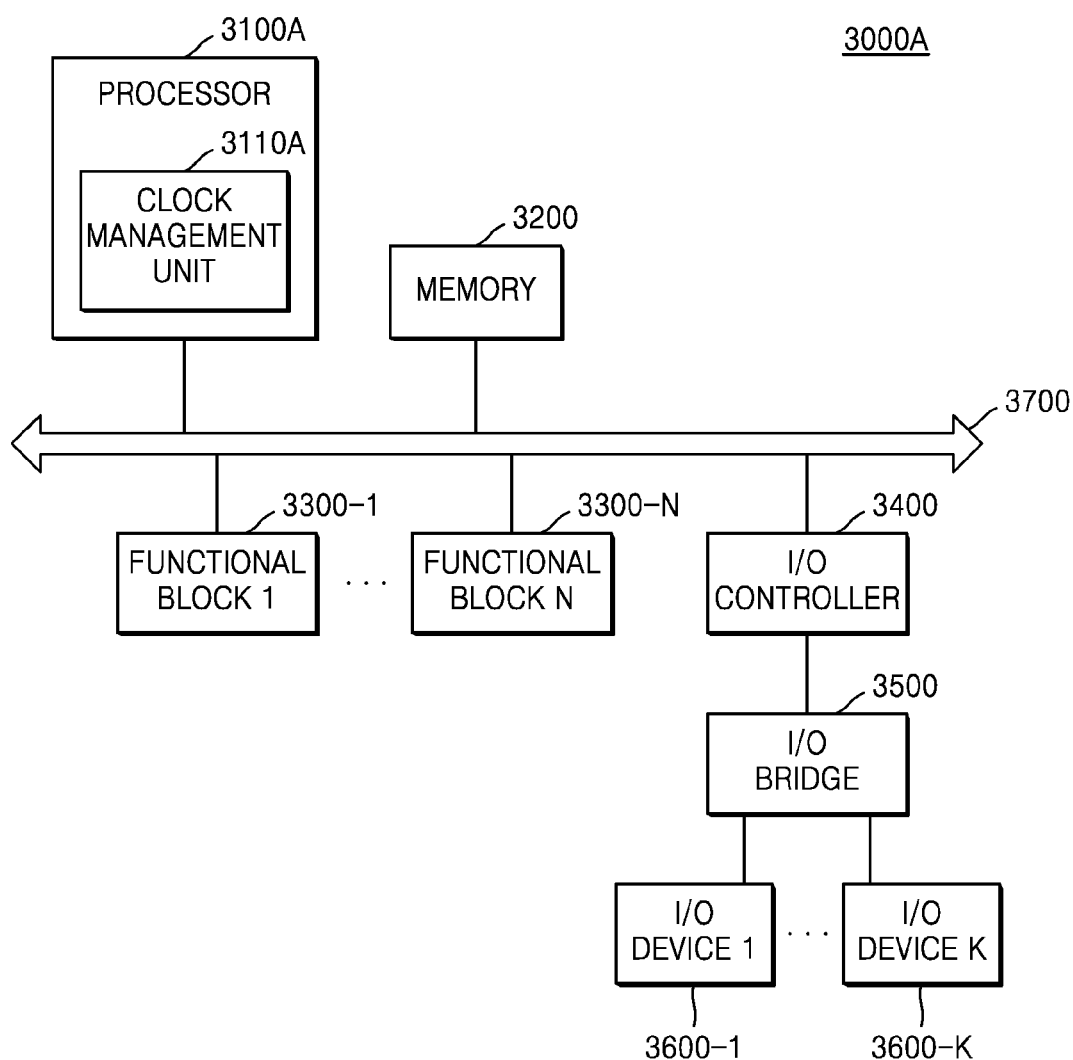
FIG. 22 illustrates a configuration of a system on chip to which a clock management unit is applied, according to another example embodiment.

FIG. 22 illustrates a configuration of a system on chip 3000B to which a clock management unit is applied, according to another example embodiment.

Referring to FIG. 22, the system on chip 3000A may include a processor 3100 including an embedded clock management unit 3110A, a memory 3200, a plurality of functional blocks 3300-1 to 3300-N, an input/output (I/O) controller 3400, an I/O bridge 3500, a plurality of I/O devices 3600-1 to 3600-K, and a bus 3700.

Since the memory 3200 and the plurality of functional blocks 3300-1 to 3300-N has the same configurations as those of the memory 2200 and the plurality of functional blocks 2300-1 to 2300-N illustrated in FIG. 20, redundant descriptions thereof will be omitted.

The processor 3100A may control operations of the memory 3200, the plurality of functional blocks 3300-1 to 3300-N, and the I/O controller 3400 connected thereto through the bus 3700. The processor 3100A may be applicable to a smart phone, a tablet personal computer (PC), a digital camera, a mobile device, a set-top box, a smart card system, a server system, and other various electronic devices.

For example, when execution of a time delay function is performed, the processor 3100A may perform an instruction fetch operation of reading a delay instruction INS_DLY from the memory 3200 and storing the delay instruction INS_DLY in an instruction register of the processor 3100A. The processor 3100A may decode and execute the delay instruction INS_DLY stored in the instruction register.

The clock management unit 120 as described with reference to FIG. 1 may be used as the clock management unit 3110A. Therefore, the clock management unit 3110A may perform a clock gating operation during a time delay period when the delay instruction INS_DLY is executed by the processor 3100A.

The I/O controller 3400 may perform an operation of controlling the I/O devices 3600-1 to 3600-K. The I/O controller 3400 may receive an I/O command from the processor 3100 and control the I/O devices 3600-1 to 3600-K based on the received I/O command.

The I/O bridge 3500 may perform an operation of controlling a channel for data communication between the processor 3100A and the I/O devices 3600-1 to 3600-K. For example, the I/O bridge 3500 may include a PCIe bridge.

Examples of the I/O devices 3600-1 to 3600-K may include a memory device, a solid state drive (SSD), a smart card, and a digital camera.

Figure 23:
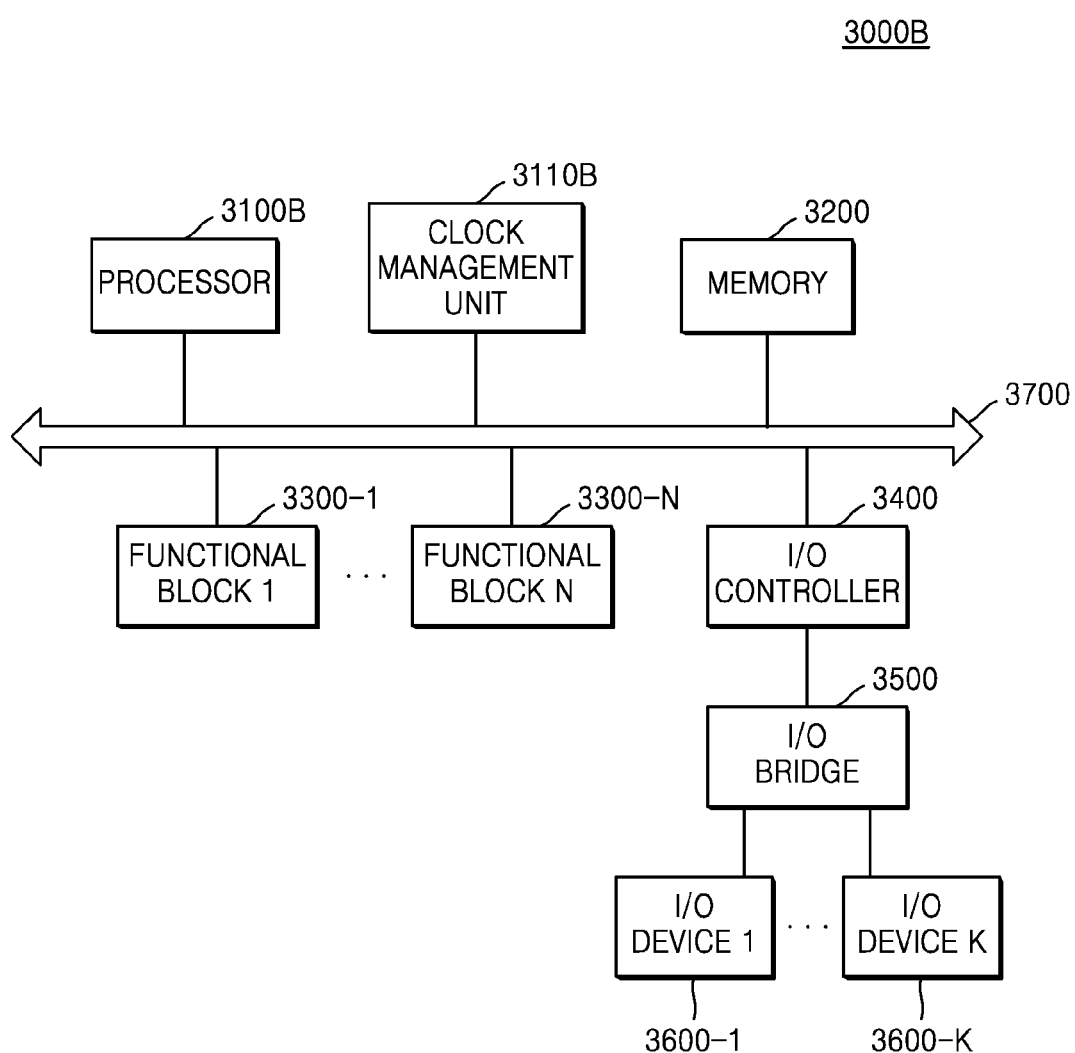
FIG. 23 illustrates a configuration of a system on chip to which a clock management unit is applied, according to another example embodiment.

FIG. 23 illustrates a configuration of a system on chip 3000B to which a clock management unit is applied, according to another example embodiment.

Referring to FIG. 23, the system on chip 3000B may include a processor 3100B, a clock management unit 3110B, a memory 3200, a plurality of functional blocks 3300-1 to 3300-N, an input/output (I/O) controller 3400, an I/O bridge 3500, a plurality of I/O devices 3600-1 to 3600-K, and a bus 3700.

The memory 3200 and the plurality of functional blocks 3300-1 to 3300-N may have the same configurations as those of the memory 2200 and the plurality of functional blocks 2300-1 to 2300-N illustrated in FIG. 20. Since the I/O controller 3400, the I/O bridge 3500, and the plurality of I/O devices 3600-1 to 3600-K have been described with reference to FIG. 22, redundant descriptions thereof will be omitted.

The processor 3100B may control operations of the clock management unit 3110B, the memory 3200, the plurality of functional blocks 3300-1 to 3300-N, and the I/O controller 3400 connected thereto through the bus 3700. The processor 3100B may be applicable to a smart phone, a tablet personal computer (PC), a digital camera, a mobile device, a set-top box, a smart card system, a server system, and other various electronic devices.

For example, when execution of a time delay function is performed, the processor 3100B may perform an instruction fetch operation of reading a delay instruction INS_DLY from the memory 3200 and storing the delay instruction INS_DLY in an instruction register of the processor 3100B. The processor 3100B may decode and execute the delay instruction INS_DLY stored in the instruction register.

The clock management unit 300 as described with reference to FIG. 2 may be used as the clock management unit 3110B. Therefore, the clock management unit 3110B may perform a clock gating operation during a time delay period when the delay instruction INS_DLY is executed by the processor 3100B.

While the inventive concepts has been particularly shown and described with reference to example embodiments thereof, it will be understood that various changes in form and details may be made therein without departing from the spirit and scope of the following claims.

What is claimed is:

1. An integrated circuit, comprising:
a clock generator configured to selectively generate a first clock;
a processor configured to perform operations; and
a clock management circuit, the clock management circuit configured to receive clock management information from the processor and selectively generate a second clock based on the clock management information and the first clock, the processor configured to perform some operations based on the second clock,
wherein the clock management circuit includes a timer for measuring a period of time to suspend generating the second clock, the period of time corresponding to a count of a number of transitions of a timer clock,
the timer clock is divided from the first clock based on the clock management information, and
the clock management information includes force gating information indicating whether to ignore interrupt information during the period of time to suspend generating the second clock, the interrupt information indicating whether the processor is to perform an interrupt operation.

2. The integrated circuit of claim 1, wherein the processor includes the clock management circuit and a plurality of function components.

3. The integrated circuit of claim 1, wherein the clock management information includes delay information indicating the period of time to suspend generating the second clock.

4. The integrated circuit of claim 1, wherein the clock management information includes clock dividing information, the clock dividing information indicating an amount by which to divide the first clock to produce the timer clock, and the timer configured to operate based on the timer clock.

5. The integrated circuit of claim 1, wherein
the processor is configured to generate the clock management information based on decoding an instruction; and
the clock management circuit includes a clock gating circuit and a control circuit, the clock gating circuit configured to selectively generate the second clock based on the first clock, and the control circuit configured to control the clock gating circuit based on the clock management information.

6. The integrated circuit of claim 5, wherein
the clock gating circuit includes,
a switch configured to selectively output the first clock as the second clock, and
a timer circuit; and
the control circuit is configured to control operation of the timer circuit based on the clock management information, and configured to control operation of the switch based on the clock management information and output of the timer circuit.

7. The integrated circuit of claim 6, further comprising:
a clock divider configured to generate a timer clock by dividing the first clock according to a divider value; and
wherein
the timer circuit is configured to operate based on the timer clock; and wherein
the clock gating circuit includes the clock divider; and
the control circuit is configured to supply the divider value to the clock divider based on the clock management information.

8. The integrated circuit of claim 6, wherein the control circuit is configured to control operation of the switch based on the clock management information, output of the timer circuit, and interrupt information, the interrupt information indicating whether the processor is to perform an interrupt operation.

9. The integrated circuit of claim 1, wherein the processor is configured to generate the clock management information based on decoding an instruction.

10. A clock management circuit comprising:
a clock gating circuit configured to receive a first clock, and configured to selectively generate a second clock based on the first clock and control signals, the clock gating circuit including a switch configured to selectively output the first clock as the second clock; and a control circuit configured to generate the control signals based on clock management information received from a processor, and configured to receive a signal from the clock gating circuit indicating a termination of a period of time to suspend generating the second clock, the signal based on a count of a number of transitions of a timer clock, wherein the control circuit is configured to control operation of a timer circuit based on the clock management information, and configured to control operation of the switch based on the clock management information and output of the timer circuit.

11. The clock management circuit of claim 10, wherein the clock gating circuit includes,
the timer circuit.

12. The clock management circuit of claim 11, further comprising:
a clock divider configured to generate the timer clock by dividing the first clock according to a divider value; and wherein
the timer circuit is configured to operate based on the timer clock;
the clock gating circuit includes the clock divider; and
the control circuit is configured to supply the divider value to the clock divider based on the clock management information.

13. The clock management circuit of claim 11, wherein the control circuit is configured to control operation of the switch based on the clock management information, output of the timer circuit, and interrupt information, the interrupt information indicating whether the processor is to perform an interrupt operation.

14. The clock management circuit of claim 11, wherein
the clock management information includes delay information indicating the period of time to suspend generating the second clock; and
the control circuit is configured to control the timer to measure the period of time, and is configured to prevent the switch from supplying the first clock as the second clock during the period of time.

15. The clock management circuit of claim 14, wherein
the clock management information includes force gating information indicating whether to ignore interrupt information during the period of time to suspend generating the second clock, the interrupt information indicating whether the processor is to perform an interrupt operation; and wherein
the control circuit is configured to enable the switch to provide the first clock as the second clock during the period of time in response to the interrupt information if the force gating information does not indicate to ignore the interrupt information.

16. The clock management circuit of claim 10, wherein
the clock management information includes delay information indicating the period of time to suspend generating the second clock; and
the clock management information includes force gating information indicating whether to ignore interrupt information during the period of time to suspend generating the second clock, the interrupt information indicating whether the processor is to perform an interrupt operation.

17. The clock management circuit of claim 10, wherein the control circuit is configured to generate the control signals based on decoding an instruction.

18. An integrated circuit, comprising:
a processor configured to perform operations based on a clock signal; and
a clock management circuit configured to receive clock management information from the processor, and configured to suspend transmission of the clock signal to the processor for a period of time based on the clock management information; and wherein
the clock management information includes delay information indicating the period of time to suspend transmission of the clock signal, and
the processor is configured to generate the clock management information based on decoding an instruction, wherein
the processor is configured to perform pipelined parallel processing, and
the processor is configured to resume the pipelined parallel processing without having to re-fill the pipeline after the time period.

19. The integrated circuit of claim 18, wherein
the clock management information includes force gating information indicating whether to ignore interrupt information during the period of time, the interrupt information indicating whether the processor is to perform an interrupt operation;
the clock management circuit is configured to provide the clock signal during the period of time in response to the interrupt information if the force gating information does not indicate to ignore the interrupt information; and
the clock management circuit is configured to resume suspending the clock signal for a remainder of the period of time if the interrupt operation ends before the period of time.

* * * * *